US010708796B2

(12) United States Patent
Sun et al.

(10) Patent No.: US 10,708,796 B2
(45) Date of Patent: Jul. 7, 2020

(54) HIGH DOPPLER CHANNEL PERFORMANCE ENHANCEMENT

(71) Applicant: QUALCOMM Incorporated, San Diego, CA (US)

(72) Inventors: Jing Sun, San Diego, CA (US); Taesang Yoo, Riverside, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/461,368

(22) Filed: Mar. 16, 2017

(65) Prior Publication Data
US 2017/0311188 A1    Oct. 26, 2017

Related U.S. Application Data

(60) Provisional application No. 62/325,946, filed on Apr. 21, 2016.

(51) Int. Cl.
*H04W 24/08* (2009.01)
*H04L 5/00* (2006.01)
(Continued)

(52) U.S. Cl.
CPC .......... *H04W 24/08* (2013.01); *H04B 7/0413* (2013.01); *H04L 5/0048* (2013.01);
(Continued)

(58) Field of Classification Search
CPC .............................. H04L 5/0048; H04W 24/08
See application file for complete search history.

(56) References Cited

U.S. PATENT DOCUMENTS

2007/0153931 A1    7/2007  Lee et al.
2010/0246527 A1    9/2010  Montojo et al.
(Continued)

FOREIGN PATENT DOCUMENTS

| JP | 2010178355 A | 8/2010 |
| WO | WO-2014088195 A1 | 6/2014 |
| WO | WO-2014168574 A1 | 10/2014 |

OTHER PUBLICATIONS

ISA/EP, International Search Report and Written Opinion of the International Searching Authority, Int'l Application No. PCT/US2017/023044, dated May 31, 2017, European Patent Office, Rijswijk, NL, 42 pgs.

*Primary Examiner* — Asad M Nawaz
*Assistant Examiner* — Zhaohui Yang
(74) *Attorney, Agent, or Firm* — Holland & Hart LLP/Qualcomm

(57) ABSTRACT

A base station may determine a Doppler metric associated with a wireless channel and a user equipment (UE). The Doppler metric may be determined from received information related to Doppler effects measured by the UE or from directly measured Doppler effects associated with uplink data received from the UE. Based on the determined Doppler metric, the base station may select one or both of a reference signal (RS) density and a channel estimation technique for the wireless channel and associated UE. The base station may transmit an indication of the RS density to the UE. Downlink data bursts and uplink data bursts may include RSs and data according to the indicated RS density. Further, the base station may transmit to the UE, an indication to communicate using the selected wireless channel estimation technique.

31 Claims, 25 Drawing Sheets

(51) Int. Cl.
  *H04B 7/0413* (2017.01)
  *H04L 27/26* (2006.01)
  *H04L 23/00* (2006.01)
  H04L 25/02 (2006.01)
  H04L 1/18 (2006.01)

(52) U.S. Cl.
  CPC ............ *H04L 5/0096* (2013.01); *H04L 23/00* (2013.01); *H04L 27/261* (2013.01); *H04L 1/1854* (2013.01); *H04L 1/1896* (2013.01); *H04L 25/023* (2013.01)

(56) References Cited

U.S. PATENT DOCUMENTS

| | | | |
|---|---|---|---|
| 2010/0290570 A1* | 11/2010 | Sathananthan | H04L 27/2647 375/346 |
| 2014/0341326 A1* | 11/2014 | Choi | H04L 25/0214 375/350 |
| 2015/0319757 A1* | 11/2015 | Baldemair | H04L 5/0051 370/329 |
| 2015/0349979 A1* | 12/2015 | Ji | H04L 25/0224 370/312 |
| 2016/0205677 A1* | 7/2016 | Kim | H04L 5/0051 370/329 |
| 2016/0211959 A1* | 7/2016 | Jongren | H04L 5/0051 |
| 2017/0163325 A1* | 6/2017 | Kang | H04B 7/0617 |
| 2017/0288837 A1* | 10/2017 | Namgoong | H04L 5/0007 |

* cited by examiner

HIGH DOPPLER CHANNEL PERFORMANCE ENHANCEMENT

CROSS REFERENCES

The present Application for Patent claims priority to U.S. Provisional Patent Application No. 62/325,946 by SUN, et al., entitled "HIGH DOPPLER CHANNEL PERFORMANCE ENHANCEMENT," filed Apr. 21, 2016, assigned to the assignee hereof.

BACKGROUND

Field of the Disclosure

The following relates generally to wireless communication, and more specifically to techniques for high Doppler channel performance enhancement.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

A base station may support communication with several UEs over multiple wireless channels. Wireless channels associated with mobile UEs may experience high Doppler conditions compared to wireless channels associated with relatively stationary UEs. High Doppler conditions may result in challenges to signal demodulation. For example, communications between a UE and a base station may include the use of reference signals (RSs). In some instances, an RS may be used for wireless channel estimation. Channel estimates may be used to demodulate and decode subsequent data portions following the RS. Thus, a high Doppler condition may impact the use of RSs to demodulate and decode data.

In some cases, using a common RS density (e.g., RSs with a set periodicity) across all wireless channels of a wireless communications system may result in decreased decoding performance for high Doppler channels, in addition to unnecessary overhead for low Doppler channels. Further, using RSs for either causal or non-causal channel estimations across all wireless channels of a wireless communications system may result in decreased decoding accuracy for high Doppler channels, in addition to unnecessary latencies in low Doppler channels.

SUMMARY

A device (e.g., a base station, an ancillary system associated with a base station, etc.) may determine a Doppler metric associated with a wireless channel and a user equipment (UE). The Doppler metric may be determined from received information related to Doppler effects measured by the UE or from directly measured Doppler effects associated with uplink (UL) data received from the UE. Based at least in part on the determined Doppler metric, the device may select one or both of a reference signal (RS) density (e.g., a UE-specific RS density, an RS density scheme different from a common RS or cell-specific RS (CRS) scheme, etc.) and an RS pattern (e.g., a pattern where an RS portion is at the beginning of each transmission time interval (TTI) in a frame, and a pattern where an RS portion is at the beginning of each TTI in a frame except for a last TTI, which has a first RS portion at the beginning of the last TTI and a second RS portion at the end of the last TTI). The RS pattern may be associated with a particular wireless channel estimation technique for the wireless channel and associated UE. The device may transmit an indication of the RS density to the UE in addition to a downlink (DL) burst to the UE including RSs and data according to the indicated RS density. The UE may additionally transmit an UL burst according to the indicated RS density. Further, the device may transmit to the UE, an indication to communicate using the selected wireless channel estimation technique.

A method of wireless communication is described. The method may include determining a Doppler metric associated with a wireless channel and a UE, selecting a first reference signal density configuration based at least in part on the Doppler metric and transmitting, by a base station to the UE, an indication of the first reference signal density configuration.

An apparatus for wireless communication is described. The apparatus may include means for determining a Doppler metric associated with a wireless channel and a UE, means for selecting a first reference signal density configuration based at least in part on the Doppler metric, and means for transmitting an indication of the first reference signal density configuration.

A further apparatus is described. The apparatus may include a processor, memory in electronic communication with the processor, and instructions stored in the memory. The instructions may be operable to cause the apparatus to determine a Doppler metric associated with a wireless channel and a UE, select a first reference signal density configuration based at least in part on the Doppler metric, and transmit an indication of the first reference signal density configuration.

A non-transitory computer readable medium for wireless communication is described. The non-transitory computer-readable medium may include instructions to cause a processor to determine a Doppler metric associated with a wireless channel and a UE, select a first reference signal density configuration based on the Doppler metric, and transmit an indication of the first reference signal density configuration.

Some examples of the method, apparatus, or non-transitory computer-readable medium described above may further include processes, features, means, or instructions for transmitting a DL data burst including reference signals and data in accordance with the first reference signal density configuration. Some examples of the method, apparatus, or non-transitory computer-readable medium described above may further include processes, features, means, or instructions for receiving a UL data burst including reference signals and data in accordance with the first reference signal density configuration.

In some examples of the method, apparatus, or non-transitory computer-readable medium described above, determining the Doppler metric includes measuring Doppler effects associated with UL data received from the UE. Some examples of the method, apparatus, or non-transitory computer-readable medium described above may further include processes, features, means, or instructions for determining the Doppler metric based on the Doppler effects associated with the UL data received from the UE.

In some examples of the method, apparatus, or non-transitory computer-readable medium described above, determining the Doppler metric includes receiving information related to Doppler effects measured by the UE. Some examples of the method, apparatus, or non-transitory computer-readable medium described above may further include processes, features, means, or instructions for determining the Doppler metric based on the information related to the Doppler effects measured by the UE.

In some examples of the method, apparatus, or non-transitory computer-readable medium described above, determining the Doppler metric includes receiving an indication of the Doppler metric from the UE. In some examples of the method, apparatus, or non-transitory computer-readable medium described above, selecting the first reference signal density configuration includes identifying a first Doppler classification associated with the Doppler metric. Some examples of the method, apparatus, or non-transitory computer-readable medium described above may further include processes, features, means, or instructions for selecting the first reference signal density configuration from a set of reference signal density configurations based on the first Doppler classification.

In some examples of the method, apparatus, or non-transitory computer-readable medium described above, transmitting the indication of the first reference signal density configuration includes transmitting, via a signaling radio bearer (SRB) channel, the indication of the first reference signal density configuration. In some examples of the method, apparatus, or non-transitory computer-readable medium described above, transmitting the indication of the first reference signal density configuration includes transmitting, via a resource grant to the UE, the indication of the first reference signal density configuration.

Some examples of the method, apparatus, or non-transitory computer-readable medium described above may further include processes, features, means, or instructions for determining an additional Doppler metric associated with the wireless channel and the UE. Some examples of the method, apparatus, or non-transitory computer-readable medium described above may further include processes, features, means, or instructions for determining that the additional Doppler metric indicates a higher Doppler shift value than the Doppler metric. Some examples of the method, apparatus, or non-transitory computer-readable medium described above may further include processes, features, means, or instructions for determining a second reference signal density configuration based on the additional Doppler metric, the second reference signal density configuration having more reference signals per transmit time interval than the first reference signal density configuration.

A method of wireless communication is described. The method may include receiving, by a UE, an indication of a first reference signal density configuration associated with a Doppler metric and communicating with a base station in accordance with the first reference signal density configuration.

An apparatus for wireless communication is described. The apparatus may include means for receiving an indication of a first reference signal density configuration associated with a Doppler metric and means for communicating with a base station in accordance with the first reference signal density configuration.

A further apparatus is described. The apparatus may include a processor, memory in electronic communication with the processor, and instructions stored in the memory. The instructions may be operable to cause the apparatus to receive an indication of a first reference signal density configuration associated with a Doppler metric and communicate with a base station in accordance with the first reference signal density configuration.

A non-transitory computer readable medium for wireless communication is described. The non-transitory computer-readable medium may include instructions to cause a processor to receive an indication of a first reference signal density configuration associated with a Doppler metric and communicate with a base station in accordance with the first reference signal density configuration.

Some examples of the method, apparatus, or non-transitory computer-readable medium described above may further include processes, features, means, or instructions for transmitting information related to Doppler effects measured by the UE. Some examples of the method, apparatus, or non-transitory computer-readable medium described above may further include processes, features, means, or instructions for transmitting an indication of a first Doppler metric for determining whether to change reference signal density configurations.

Some examples of the method, apparatus, or non-transitory computer-readable medium described above may further include processes, features, means, or instructions for transmitting an indication of one or more supportable reference signal density configurations. In some examples of the method, apparatus, or non-transitory computer-readable medium described above, communicating with the base station includes transmitting a UL data burst including reference signals and data in accordance with the first reference signal density configuration.

In some examples of the method, apparatus, or non-transitory computer-readable medium described above, communicating with the base station includes receiving a first downlink data burst including reference signals and data in accordance with the first reference signal density configuration. Some examples of the method, apparatus, or non-transitory computer-readable medium described above may further include processes, features, means, or instructions for decoding the first DL data burst based on the first reference signal density configuration.

Some examples of the method, apparatus, or non-transitory computer-readable medium described above may further include processes, features, means, or instructions for receiving an indication of a second reference signal density configuration different from the first reference signal density configuration, the second reference signal density configuration having more reference signals per transmit time interval than the first reference signal density configuration. Some examples of the method, apparatus, or non-transitory computer-readable medium described above may further include processes, features, means, or instructions for receiving a second DL data burst including reference signals and data in accordance with the second reference signal density configuration. Some examples of the method, apparatus, or non-transitory computer-readable medium described above may further include processes, features, means, or instructions for decoding the second DL data burst based on the second reference signal density configuration.

Some examples of the method, apparatus, or non-transitory computer-readable medium described above may further include processes, features, means, or instructions for transmitting an indication of a suggested reference signal density configuration. In some examples of the method, apparatus, or non-transitory computer-readable medium described above, receiving the indication of the first reference signal density configuration includes receiving, via an SRB channel, the indication of the first reference signal density configuration.

In some examples of the method, apparatus, or non-transitory computer-readable medium described above, receiving the indication of the first reference signal density configuration includes receiving, via a resource grant from the base station, the indication of the first reference signal density configuration.

A method of wireless communication is described. The method may include determining a Doppler condition associated with a wireless channel and a UE, selecting, from a plurality of wireless channel estimation techniques and based at least in part on the Doppler condition, a wireless channel estimation technique associated with communicating with the UE and transmitting, by a base station to the UE, an indication to communicate using the wireless channel estimation technique.

An apparatus for wireless communication is described. The apparatus may include means for determining a Doppler condition associated with a wireless channel and a UE, means for selecting, from a plurality of wireless channel estimation techniques and based at least in part on the Doppler condition, a wireless channel estimation technique associated with communicating with the UE and means for transmitting an indication to communicate using the wireless channel estimation technique.

A further apparatus is described. The apparatus may include a processor, memory in electronic communication with the processor, and instructions stored in the memory. The instructions may be operable to cause the apparatus to determine a Doppler condition associated with a wireless channel and a UE, select, from a plurality of wireless channel estimation techniques and based at least in part on the Doppler condition, a wireless channel estimation technique associated with communicating with the UE and transmit an indication to communicate using the wireless channel estimation technique.

A non-transitory computer readable medium for wireless communication is described. The non-transitory computer-readable medium may include instructions to cause a processor to determine a Doppler condition associated with a wireless channel and a UE, select, from a set of wireless channel estimation techniques and based on the Doppler condition, a wireless channel estimation technique associated with communicating with the UE and transmit an indication to communicate using the wireless channel estimation technique.

In some examples of the method, apparatus, or non-transitory computer-readable medium described above, selecting the wireless channel estimation technique includes determining that the Doppler condition is below a threshold (e.g., satisfies a threshold). Some examples of the method, apparatus, or non-transitory computer-readable medium described above may further include processes, features, means, or instructions for selecting a causal wireless channel estimation technique as the wireless channel estimation technique.

In some examples of the method, apparatus, or non-transitory computer-readable medium described above, selecting the wireless channel estimation technique includes determining that the Doppler condition is above a threshold (e.g., satisfies a threshold). Some examples of the method, apparatus, or non-transitory computer-readable medium described above may further include processes, features, means, or instructions for selecting a non-causal wireless channel estimation technique as the wireless channel estimation technique.

Some examples of the method, apparatus, or non-transitory computer-readable medium described above may further include processes, features, means, or instructions for transmitting a DL data burst including reference signals and data such that a first set of reference signals and a second set of reference signals are included in a last TTI of the DL data burst.

Some examples of the method, apparatus, or non-transitory computer-readable medium described above may further include processes, features, means, or instructions for transmitting a DL data burst including reference signals and data such that a last TTI of the DL data burst for the UE is not scheduled in a last TTI of a DL transmission period that includes other UEs. Some examples of the method, apparatus, or non-transitory computer-readable medium described above may further include processes, features, means, or instructions for receiving an UL data burst including reference signals and data such that a first set of reference signals and a second set of reference signals are included in a last TTI of the UL data burst.

In some examples of the method, apparatus, or non-transitory computer-readable medium described above, transmitting the indication to communicate using the wireless channel estimation technique includes transmitting, via a DL SRB channel, the indication to communicate using the wireless channel estimation technique.

In some examples of the method, apparatus, or non-transitory computer-readable medium described above, transmitting the indication to communicate using the wireless channel estimation technique includes transmitting, via a resource grant to the UE, the indication to communicate using the wireless channel estimation technique. In some examples of the method, apparatus, or non-transitory computer-readable medium described above, transmitting the indication to communicate using the wireless channel estimation technique includes transmitting, via one or more bits associated with downlink control information (DCI), the indication to communicate using the wireless channel estimation technique.

Some examples of the method, apparatus, or non-transitory computer-readable medium described above may further include processes, features, means, or instructions for receiving a request to switch to communicating using a non-causal wireless channel estimation technique. Some examples of the method, apparatus, or non-transitory computer-readable medium described above may further include processes, features, means, or instructions for receiving, via an UL SRB channel, a request to switch to communicating using the non-causal wireless channel estimation technique.

A method of wireless communication is described. The method may include receiving, by a UE, a first indication to communicate using a causal wireless channel estimation technique associated with a first Doppler condition and determining to switch from the causal wireless channel estimation technique to a non-causal wireless channel estimation technique for communicating with a base station.

An apparatus for wireless communication is described. The apparatus may include means for receiving a first indication to communicate using a causal wireless channel estimation technique associated with a first Doppler condition and means for determining to switch from the causal wireless channel estimation technique to a non-causal wireless channel estimation technique for communicating with a base station.

A further apparatus is described. The apparatus may include a processor, memory in electronic communication with the processor, and instructions stored in the memory. The instructions may be operable to cause the apparatus to receive a first indication to communicate using a causal wireless channel estimation technique associated with a first Doppler condition and determine to switch from the causal wireless channel estimation technique to a non-causal wireless channel estimation technique for communicating with a base station.

A non-transitory computer readable medium for wireless communication is described. The non-transitory computer-readable medium may include instructions to cause a processor to receive a first indication to communicate using a causal wireless channel estimation technique associated with a first Doppler condition and determine to switch from the causal wireless channel estimation technique to a non-causal wireless channel estimation technique for communicating with a base station.

In some examples of the method, apparatus, or non-transitory computer-readable medium described above, determining to switch from the causal wireless channel estimation technique to the non-causal wireless channel estimation technique includes receiving a second indication to communicate using the non-causal wireless channel estimation technique associated with a second Doppler condition different from the first Doppler condition. Some examples of the method, apparatus, or non-transitory computer-readable medium described above may further include processes, features, means, or instructions for switching from the causal wireless channel estimation technique to the non-causal wireless channel estimation technique for communicating with the base station.

Some examples of the method, apparatus, or non-transitory computer-readable medium described above may further include processes, features, means, or instructions for receiving a first DL data burst including reference signals and data in accordance with the causal wireless channel estimation technique. Some examples of the method, apparatus, or non-transitory computer-readable medium described above may further include processes, features, means, or instructions for decoding the first DL data burst using the causal wireless channel estimation technique. Some examples of the method, apparatus, or non-transitory computer-readable medium described above may further include processes, features, means, or instructions for receiving a second data burst including reference signals and data in accordance with the non-causal wireless channel estimation technique. Some examples of the method, apparatus, or non-transitory computer-readable medium described above may further include processes, features, means, or instructions for decoding the second data burst using the non-causal wireless channel estimation technique.

Some examples of the method, apparatus, or non-transitory computer-readable medium described above may further include processes, features, means, or instructions for transmitting a first UL data burst including reference signals and data in accordance with the causal wireless channel estimation technique. Some examples of the method, apparatus, or non-transitory computer-readable medium described above may further include processes, features, means, or instructions for transmitting a second UL data burst including reference signals and data in accordance with the non-causal wireless channel estimation technique.

Some examples of the method, apparatus, or non-transitory computer-readable medium described above may further include processes, features, means, or instructions for transmitting a request to switch to communication using the non-causal wireless channel estimation technique.

Some examples of the method, apparatus, or non-transitory computer-readable medium described above may further include processes, features, means, or instructions for transmitting, via a UL SRB channel, a request to switch to communicating using the non-causal wireless channel estimation technique. In some examples of the method, apparatus, or non-transitory computer-readable medium described above, determining to switch from the causal wireless channel estimation technique includes determining, based on Doppler effects measured by the UE, that a Doppler condition is above a threshold (e.g., satisfies a threshold), the Doppler condition being associated with a wireless channel and the UE.

In some examples of the method, apparatus, or non-transitory computer-readable medium described above, determining to switch from the causal wireless channel estimation technique includes receiving an indication to communicate using the non-causal wireless channel estimation technique. In some examples of the method, apparatus, or non-transitory computer-readable medium described above, determining to switch from the causal wireless channel estimation technique includes receiving, via a DL SRB channel, an indication to communicate using the non-causal wireless channel estimation technique.

In some examples of the method, apparatus, or non-transitory computer-readable medium described above, determining to switch from the causal wireless channel estimation technique includes receiving, via a resource grant from the base station, an indication to communicate using the non-causal wireless channel estimation technique. In some examples of the method, apparatus, or non-transitory computer-readable medium described above, determining to switch from the causal wireless channel estimation technique includes receiving, via one or more bits associated with DCI, an indication to communicate using the non-causal wireless channel estimation technique.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
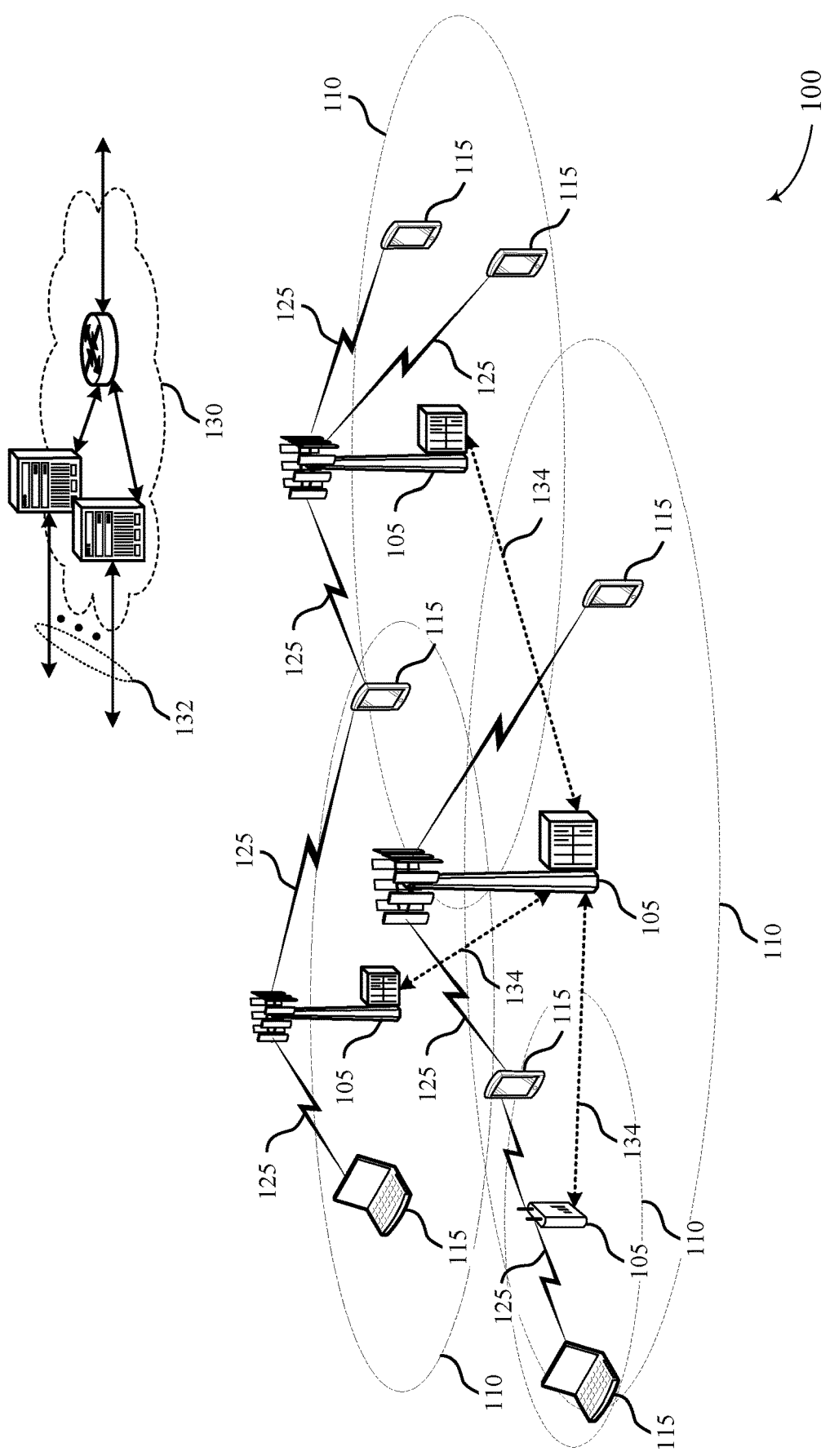
FIG. 1 illustrates an example of a wireless communications system that supports high Doppler channel performance enhancement in accordance with aspects of the present disclosure.

The described features generally relate to improved systems, methods, and devices for demodulating and decoding data in wireless channels having high and varying Doppler conditions. Changes to one or both of a reference signal (RS) density and an RS pattern may be performed based at least in part on a detected Doppler condition. The RS pattern may be associated with a particular wireless channel estimation technique of a wireless channel. For example, the RS pattern for interpolation of channel estimates (e.g., non-causal estimates) may include an RS at the beginning of each TTI in a frame except for a last TTI, which has a first RS at the beginning of the last TTI and a second RS at the end of the last TTI. RSs may be located at the beginning of a subframe and may be followed by data. Therefore, channel estimation may be performed first, followed by data demodulation and decoding (e.g., after channel estimation, a user equipment (UE) may enter data demodulation and decoding mode). To support higher Doppler conditions, an RS scheme may be repeated periodically to enable channel estimation with updated RSs. The refreshed channel estimates may be used for data demodulation in the data portion that generally follows before the next RS is repeated. RS density may define the periodicity of RSs and may be determined based at least in part on Doppler conditions or system requirements. Multiple RS density modes may be signaled to a UE depending on the Doppler conditions. For example, for high Doppler conditions, a high RS density may be used. The RS density may further be configurable by a UE and/or a base station as a function of Doppler conditions.

Channel estimation techniques may also depend on a Doppler condition. In the case of high Doppler conditions, interpolation of channel estimates (e.g., non-causal estimates) may be implemented. In the case of low Doppler conditions, extrapolation of channel estimates (e.g., causal estimates) may be implemented. The ability to change between causal (interpolation) and non-causal (extrapolation) techniques may provide for more effective data demodulation when the wireless channel varies. Thus, a configurable wireless channel estimation technique and demodulation and decoding processing timeline to enable switching between causal and non-causal channel processing may be implemented. In some examples, channel estimation techniques may be linked with a particular RS density or RS pattern such that determining whether to use causal and non-causal channel processing is based at least in part on one or both of an RS density or an RS pattern. Radio resource control (RRC) signaling may be used to configure a UE into non-causal mode, and may apply to both downlink (DL) and uplink (UL). Changes in the RS pattern involving the data structure of a burst (e.g., a transmission of a contiguous sequence of symbols) to a particular UE and a scheduler for scheduling data for that particular UE (e.g., to avoid scheduling data for a UE in a last TTI of a DL transmission period (e.g., a predefined DL transmission period that includes other UEs) when that UE is operating in the non-causal mode) may be implemented when using non-causal channel estimates for demodulating and decoding data to ensure timely processing of the data. By avoiding scheduling data for a UE in a last TTI in a predefined DL transmission period when that UE is operating in the non-causal mode, sufficient time is provided for that UE to perform the non-causal channel estimation and subsequent demodulating and decoding data of the received data prior to a time when acknowledgement messages are to be sent on a subsequent UL transmission frame.

Doppler estimating techniques (e.g., Doppler detection based on physical (PHY) layer algorithms) may be used by a base station or a UE for Doppler measurements. Therefore, Doppler estimation techniques may be useful in determining both an RS density as well as an RS pattern and whether to use causal or non-causal channel estimation techniques. Selection of the RS density mode may depend on Doppler measurements or UE capabilities. RSs may be used to perform causal channel estimates (e.g., causal mode) or non-causal channel estimates (e.g., non-causal mode). Wireless systems may be designed to support both causal mode and non-causal mode timelines.

Aspects of the disclosure are initially described in the context of a wireless communication system. Examples of wireless communications systems supporting high Doppler channel performance enhancement are then described, in addition to RS density configurations and wireless channel estimation configurations. Aspects of the disclosure are further illustrated by and described with reference to apparatus diagrams, system diagrams, and flowcharts that relate to high Doppler channel performance enhancement.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may further support high Doppler channel performance enhancements.

Wireless communications system 100 may support enhanced component carriers (eCCs) and similar carrier aggregation schemes. Physical downlink shared channels (PDSCH) and physical uplink shared channels (PUSCH) may be designed to maximize decoding speed in wireless communications system 100. The maximum data rate may be increased and turnaround time may be reduced when utilizing PDSCH and PUSCH.

RSs may be located at the beginning of a subframe or transmit time interval (TTI) and may be followed by data. Channel estimation may be performed first, followed by data demodulation and decoding (e.g., after channel estimation, a UE 115 may enter a data demodulation and decoding mode). To support higher Doppler conditions, the RS may be repeated periodically (e.g., every 40 µs 100 µs, 200 µs, 400 µs, etc.) at a rate that is faster than that typically used for lower Doppler conditions. Repetition of an RS allows the performance of channel estimation with updated RSs. The refreshed channel estimates (e.g., performed with more recent RSs) may be used for data demodulation in the data portion that follows before the next RS is repeated. The more frequent extrapolation of the channel estimation may provide for more effective data demodulation and decoding when the wireless channel varies. For example, for high Doppler conditions, a high RS density (e.g., RSs repeated with shorter periodicity) may be used. The RS density may further be configurable by one or both of a UE 115 and a base station 105.

Additionally, techniques for channel estimates may also be configurable, based on Doppler conditions. In the case of high Doppler, interpolation of channel estimates (e.g., non-causal estimates) may be implemented instead of extrapolation of channel estimates (e.g., causal estimates). Non-causal channel estimates may result in higher decoding delay. A configurable wireless channel estimation technique and demodulation and decoding processing timeline to enable switching between causal and non-causal channel processing may be implemented.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may insert periodic pilot symbols such as cell-specific reference signals (CRSs) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements (REs) in each resource block (RB) based on the number of antenna ports or layers (up to 4) of the receiving UEs 115.

In addition to CRS, which may be utilized by all UEs 115 in the coverage area 110 of the base station 105, demodulation reference signal (DMRS) may be directed toward specific UEs 115 and may be transmitted only on RBs assigned to those UEs 115. DMRS may include signals on 6 REs in each RB in which they are transmitted. The DMRS for different antenna ports may each utilize the same 6 REs, and may be distinguished using different orthogonal cover codes (e.g., masking each signal with a different combination of 1 or −1 in different REs). In some cases, two sets of DMRS may be transmitted in adjoining REs. In some cases, additional reference signals known as channel state information (CSI) reference signals (CSI-RS) may be included to aid in generating CSI. On the UL, a UE 115 may transmit a combination of periodic sounding reference signal (SRS) and UL DMRS for link adaptation and demodulation, respectively.

In some cases, wireless communications system 100 may utilize enhanced component carriers (eCCs). An eCC may be characterized by one or more features including, but not limited to: wider bandwidth, shorter symbol duration, shorter TTIs, and modified control channel configuration. In some cases, an eCC may be associated with a carrier aggregation (CA) configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

Figure 2:
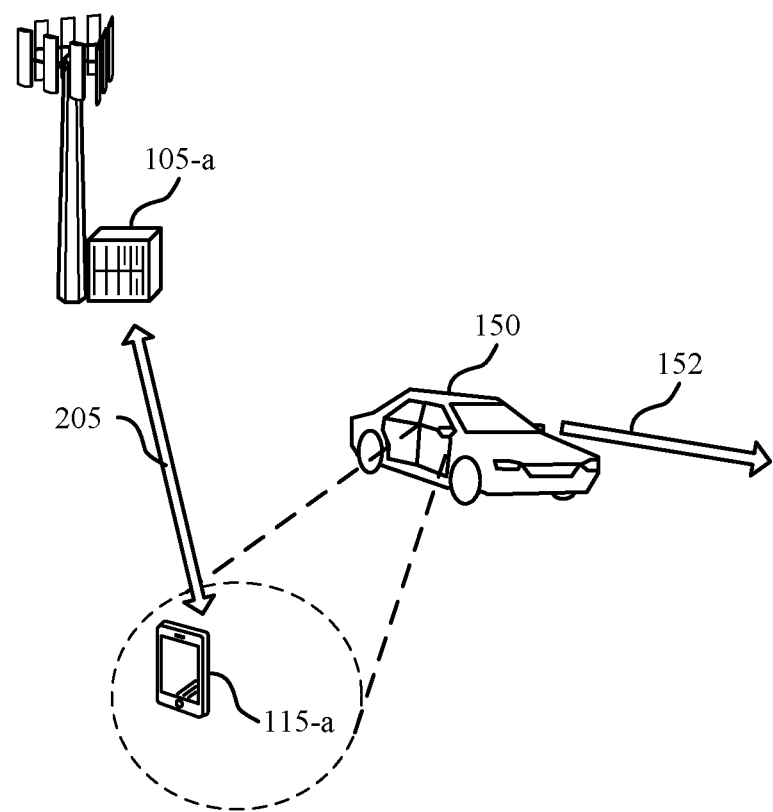
FIG. 2 illustrates an example of a wireless communications system that supports high Doppler channel performance enhancement in accordance with aspects of the present disclosure.

FIG. 2 illustrates an example of a wireless communications system 200 in which high Doppler channel performance enhancement techniques may be performed. Wireless communications system 200 may include base station 105-*a* and UE 115-*a*, which may be examples of the corresponding devices described with reference to FIG. 1. Wireless communications system 200 supports changing RS density configurations and changing wireless channel estimation techniques (as well as RS pattern configurations) associated with wireless communication via wireless channel 205. The changing of one or both of RS density configurations and RS pattern configurations for use with wireless channel estimation techniques may be based at least in part on measured or determined Doppler effects associated with the wireless channel 205. It is understood that the RS density configurations and RS pattern configurations disclosed herein may apply to various types of reference signals, such as but not limited to CSI-RS and DMRS sequences. In a non-limiting scenario, a UE 115-*a* may be inside a mobile vehicle 150 moving relative to base station 105-*a* (e.g., movement 152). The movement 152 of UE 115-*a* may result in high Doppler condition of wireless channel 205. Additionally, a rate of the movement 152 of UE-115 may vary during the time in which wireless channel 205 is utilized for wireless communication, thereby frequently changing the Doppler condition.

RS density may define the periodicity of RSs and may be determined based at least in part on Doppler conditions (e.g., measured or determined Doppler effects on wireless channel 205) or system requirements (e.g., capabilities of the UE). A higher RS density may result in more accurate channel estimation and increased decoding performance. For example, if Doppler effects are high, the decoding performance with one RS per 4 orthogonal frequency division multiplexing (OFDM) symbols may be greater than the decoding performance with one RS per 8 OFDM symbols. Alternatively, a lower RS density may result in decreased overhead. Time domain RS density may be applied for high Doppler channels. RS density may further be determined based at least in part on performance and overhead requirements.

RS density may be configurable as a function of measured or determined Doppler effects. An RS configuration may have RSs at the beginning of each TTI. A High Doppler mode may additionally configure RSs in the middle of each TTI or at certain intervals in each TTI. RS density may start at a default value and, if a base station determines that the Doppler is high, may switch to High Doppler mode (e.g., the density of RSs in a subsequent TTI is increased from a previously density of RSs in a prior TTI having a same size as the subsequent TTI). In some implementations, wireless communications system 200 may include multiple RS density configurations or modes associated with various levels of Doppler conditions.

An RS density mode may be signaled to UE 115-*a* based at least in part on determining a particular Doppler condition. An RS density mode may be signaled to UE 115-*a* and processing may be performed according to the signaled RS density mode. The RS density mode may be signaled to UE 115-*a* in various ways. For example, the RS density mode may be signaled to UE 115-*a* via RRC signaling. Further, the RS density mode may be physical downlink control channel (PDCCH) based. The RS density mode may be included in the grant to allow for dynamic changing of the RS density.

Selection of the RS density mode may depend on Doppler measurements or UE 115-*a* capabilities. Doppler estimating algorithms may be used by base station 105-*a* or UE 115-*a* for Doppler measurements. Doppler measurements may be used for selection of the RS density mode. Further, UE 115-*a* may not support all RS density modes, in which case, UE 115-*a* may signal RS capacity or supported RS density modes to base station 105-*a*. UE 115-*a* may have different channel estimation algorithms that can handle Doppler conditions differently. For example, UE 115-*a* may be capable of data aided channel estimation and may be able to handle higher Doppler conditions given the same RS density. In this case, UE 115-*a* may directly signal an RS density suggestion (e.g., instead of Doppler conditions or measurements thereof) to account for the difference in the UE 115-*a* receiver structure.

RSs may be used to perform causal channel estimates (e.g., causal mode) or non-causal channel estimates (e.g., non-causal mode). In causal mode, the channel estimation, channel demodulation, and channel decoding may begin after the first RS (e.g., the RS prior to the data portion). Causal mode may support symbol-by-symbol processing for the data portion. An RS immediately preceding a data portion in a frame may be used to estimate a channel, and that channel estimation may then be used for demodulation and decoding data in the data portion that follows. In the non-causal mode, the channel estimation, channel demodulation, and channel decoding may be delayed until reception of a second RS following a data portion. This second RS, which is to be used with a first RS to ascertain a channel estimate, may be positioned at a beginning portion of a next TTI or may be an added portion proximal to an end of a last TTI. In this manner, a channel estimation may be determined based at least in part on both the first RS and the second RS, and that channel estimation may be used in demodulation and decoding data in the data portion positioned between the first RS and the second RS.

Wireless communications system 200 may be designed to support both causal mode and non-causal mode timelines (e.g., for wireless channel 205). For low Doppler channel conditions, causal mode may be used for increased turn around. For high Doppler channel conditions, non-causal mode may be used for more accurate channel estimation. Wireless channels with high Doppler conditions may have lower data rates compared to channels with low Doppler conditions in the same system. Lower data rates may result in faster decoding in non-causal mode as there may be less data to decode. Wireless communications system 200 may employ a causal mode with RS inserted at the beginning of every period (e.g., every 400 μs). When UE 115-*a* is detected to be in high Doppler conditions, UE 115-*a* may switch to a non-causal mode. Another set of RSs may be added at the end of the burst for UE 115-*a* (e.g., a last TTI of a plurality of TTIs in the burst scheduled for UE 115-*a*). In the non-causal mode, because the demodulating and decoding timeline of a data portion between a first RS and second RS is delayed (i.e., the channel estimation process is delayed until both the first RS and second RS are received), a lower data rate associated with the data portions may be used in the non-causal mode than the data rate associated with the data portions in the causal mode so that the data may be properly demodulated and decoded in high Doppler conditions. sufficient time to determine proper receipt of the received data and transmit acknowledgement messages within an appropriate response time. Similarly, in some cases, data for a UE operating in the non-causal mode is not scheduled for a last TTI of a predefined DL transmission period so that enough time is provided for the delayed demodulating and decoding processing timeline associated with the non-causal mode for transmitting acknowledgement messages within an appropriate response time (e.g., transmitting acknowledgement messages in an UL transmission that follows the end of the DL transmission). For example, a scheduler (e.g., a scheduling component of a base station) may avoid scheduling data for a UE operating in the non-causal mode in a last TTI of a predefined DL transmission period and may use the last TTI of the predefined DL transmission period to schedule data for another UE that is operating in the causal mode.

RRC signaling may be used to configure UE 115-*a* into non-causal mode and may apply to both DL and UL. After switching to non-causal mode, the base station transmitter (e.g., the transmitter of base station 105-*a*) may transmit an additional RS at the end of the burst (e.g., such that a last TTI has two RS portions), and the receiver of UE 115-*a* may be configured to use the additional RS and switch to the non-causal processing scheme (e.g., having a different demodulation and decoding timeline for the data in a burst from the causal processing scheme). The configurable wireless channel estimation technique (and associated demodulation and decoding processing timeline) may be dynamically signaled with DL/UL grants in PDCCH. One or more bits in downlink control information (DCI) may indicate to UE 115-a that there is another set of RS at the end of the last TTI of scheduled to burst and that UE 115-a may switch to non-causal mode. The indication may also signal that UE 115-a may not be provided data in the last TTI in DL, and therefore will have enough time to complete demodulation and decoding processing of the received data.

As such, special considerations (e.g., avoiding scheduling data in a last TTI of a DL transmission) may be made for UE 115-a operating in the non-causal mode so that subsequent feedback operations (e.g., transmitting acknowledgements) may be timely performed due to the increased demodulation and decoding processing timeline associated with determining non-causal channel estimates. Accordingly, in some cases, a scheduler may avoid scheduling data for UE 115-a in the last TTI of a predefined DL transmission period when UE 115-a is operating in the non-causal mode. For TTIs that are transmitted earlier in a burst for UE 115-a (i.e., not the last TTI for UE 115-a), UE 115-a, when operating in the non-casual mode, will use the RS at the beginning of an earlier TTI and a subsequent RS at the beginning of a next TTI to perform a non-causal channel estimation that is used to demodulate and decode a data portion of the earlier TTI. For the last TTI in the burst for UE 115-a, UE 115-a will use a first RS at the beginning of the last TTI and a second RS at the end of the last TTI to perform a non-causal channel estimation that is used to demodulate and decode a data portion of the last TTI. As the DL burst with data for UE 115-a is not scheduled in a last TTI of the DL transmission, UE 115-a may report acknowledgement (ACK)/negative-acknowledgement (NACK) messages in a timely manner. For UL, base station 105-a may control the time to send ACK/NACK messages. As such, base station 105-a (or UE 115-a) may decide to schedule UE 115-a to send a full UL burst (e.g., include data in a last TTI of an UL transmission).

Figure 3A:
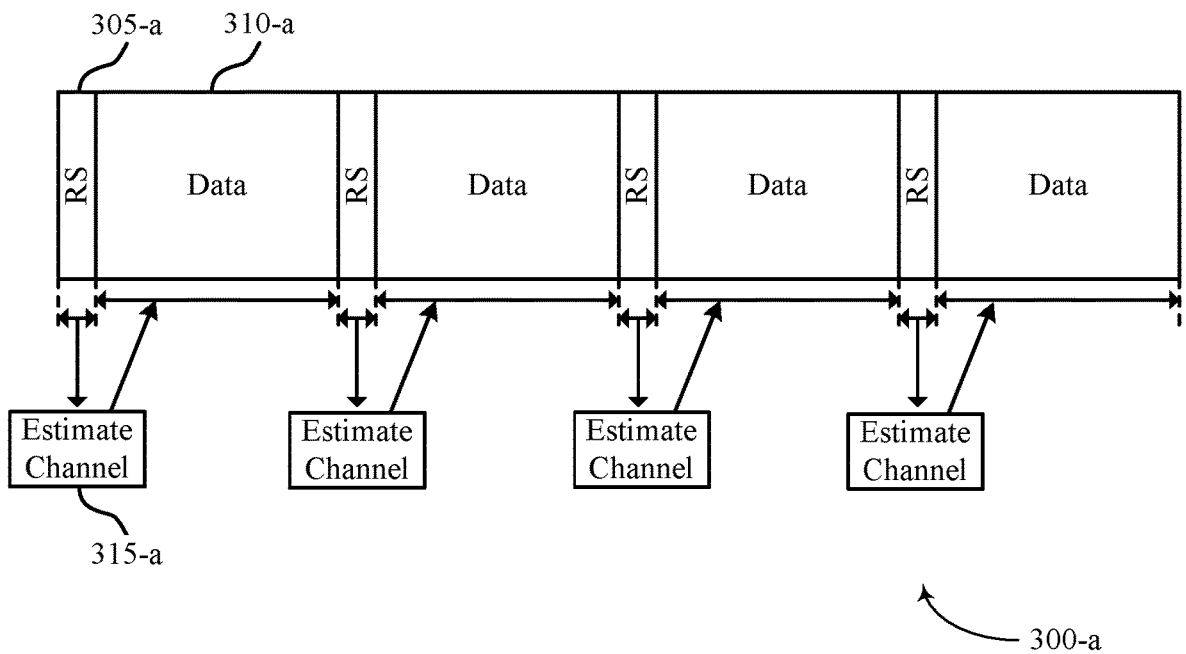
FIGS. 3A and 3B illustrate examples of reference signal (RS) density configurations that support high Doppler channel performance enhancement in accordance with aspects of the present disclosure.

FIG. 3A illustrates an example of an RS density configuration 300-a that may be used in performing high Doppler channel performance enhancement techniques. In some cases, RS density configuration 300-a may represent aspects of techniques performed by a UE 115 or base station 105 as described with reference to FIGS. 1-2. In some cases, RS density configuration 300-a may be configured as a low Doppler mode when low Doppler effects are either measured by a UE 115 or determined by a base station 105.

RS density configuration 300-a may have an RS at the beginning of each TTI in a burst. The RS density configuration 300-a may further include data portions following each RS. For example, a first TTI may include RS 305-a and data portion 310-a. RS 305-a may be used to make a channel estimate 315-a. Channel estimate 315-a may be determined and used to demodulate or decode the subsequent data portion 310-a. This channel estimation process may be continued for each RS and data portion in the received burst.

Figure 3B:
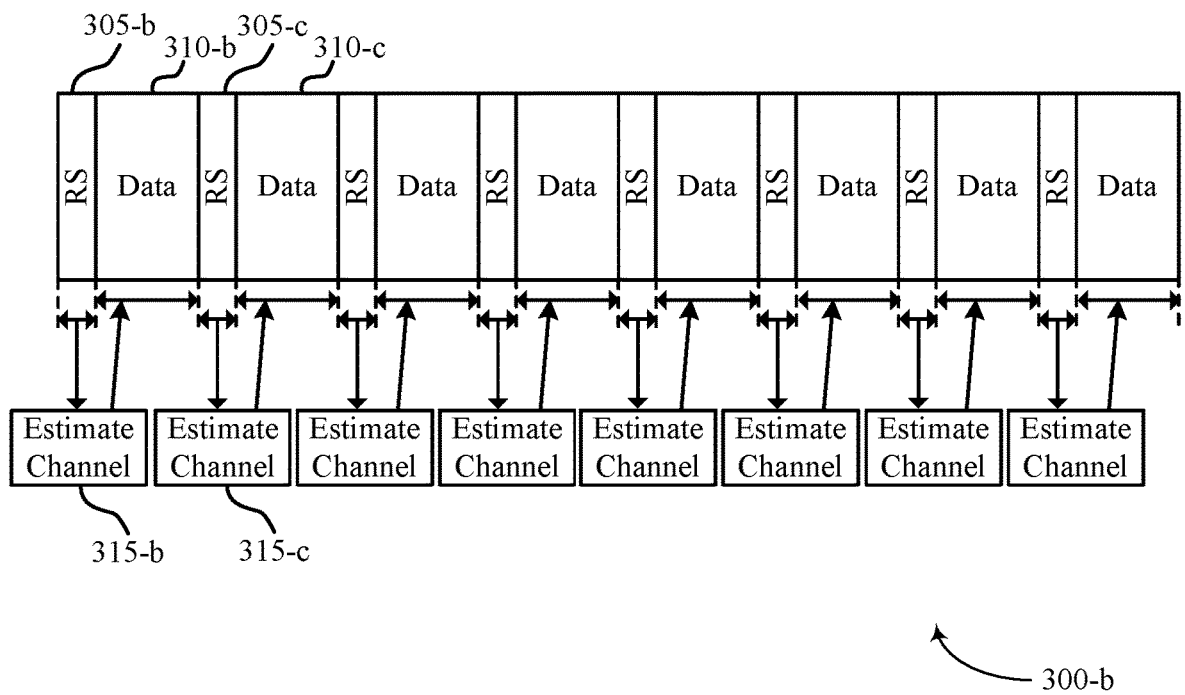

FIG. 3B illustrates an example of an RS density configuration 300-b that may be used in performing high Doppler channel performance enhancement techniques high Doppler channel performance enhancement. In some cases, RS density configuration 300-b may represent aspects of techniques performed by a UE 115 or base station 105 as described with reference to FIGS. 1-2. In some cases, RS density configuration 300-b may be configured as a high Doppler mode when high Doppler effects are either measured by a UE 115 or determined by a base station 105.

RS density configuration 300-b may have an RS at the beginning of each TTI in addition to an RS in the middle of each TTI. The RS density configuration 300-b may further include data portions following each RS. That is, the RSs of RS density configuration 300-b may have a shorter periodicity than the RSs of RS density configuration 300-a (e.g., where a duration of the TTIs of a burst using RS density configurations 300-a, 300-b is the same). The shorter RS periodicity of RS density configuration 300-b may result in more accurate channel estimates 315 for demodulating or decoding subsequent data portions associated with changing channel conditions (e.g., Doppler conditions).

For example, a first TTI may include RS 305-a, data portion 310-b, RS 305-c, and data portion 310-c. RS 305-b may be used to make a channel estimate 315-b. Channel estimate 315-b may be used to demodulate or decode the subsequent data portion 310-b of the TTI. RS 305-c may then be used to make channel estimate 315-c. Channel estimate 315-c may be used to demodulate or decode subsequent data portion 310-c. This channel estimation process in which multiple channel estimates per TTI are performed may be continued for each RS and data portion in the received burst.

Figure 4A:
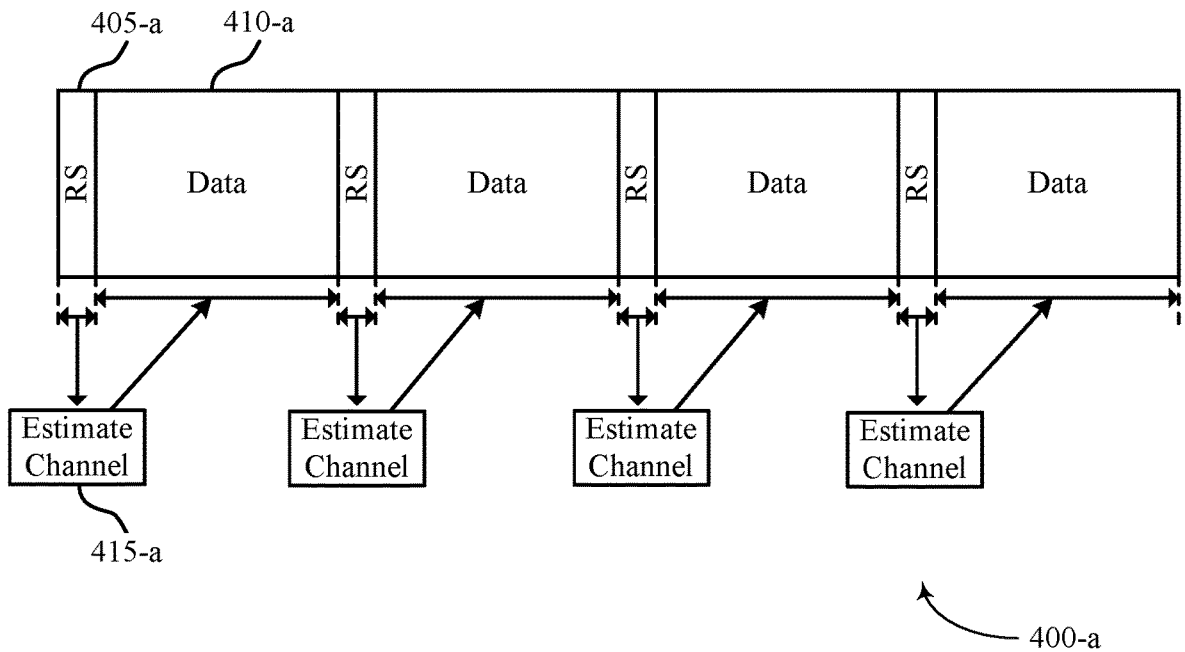
FIGS. 4A and 4B illustrate examples of wireless channel estimation configurations that support high Doppler channel performance enhancement in accordance with aspects of the present disclosure.

FIG. 4A illustrates an example of a wireless channel estimation configuration 400-a that may be used in performing high Doppler channel performance enhancement techniques. In some cases, wireless channel estimation configuration 400-a may represent aspects of wireless channel estimation techniques performed by a UE 115 or base station 105 as described with reference to FIGS. 1-2.

Wireless channel estimation configuration 400-a illustrates an RS pattern with which RSs are used for causal channel estimates (e.g., causal mode). Wireless channel estimation configuration 400-a may have an RS at the beginning of each TTI. The wireless channel estimation configuration 400-a may further include data portions following each RS. For example, a first TTI may include RS 405-a and data portion 410a. RS 405-a may be used to make a channel estimate 415-a. Channel estimate 415-a may be used to demodulate or decode the subsequent data portion 410-a. This channel estimation process may be continued for each RS and data portion in the received burst. Additionally or alternatively, in the causal mode, each TTI may include multiple RS and data portions, and channel estimation and associated demodulation and decoding may be performed similar to that described with reference to FIG. 3B.

Figure 4B:
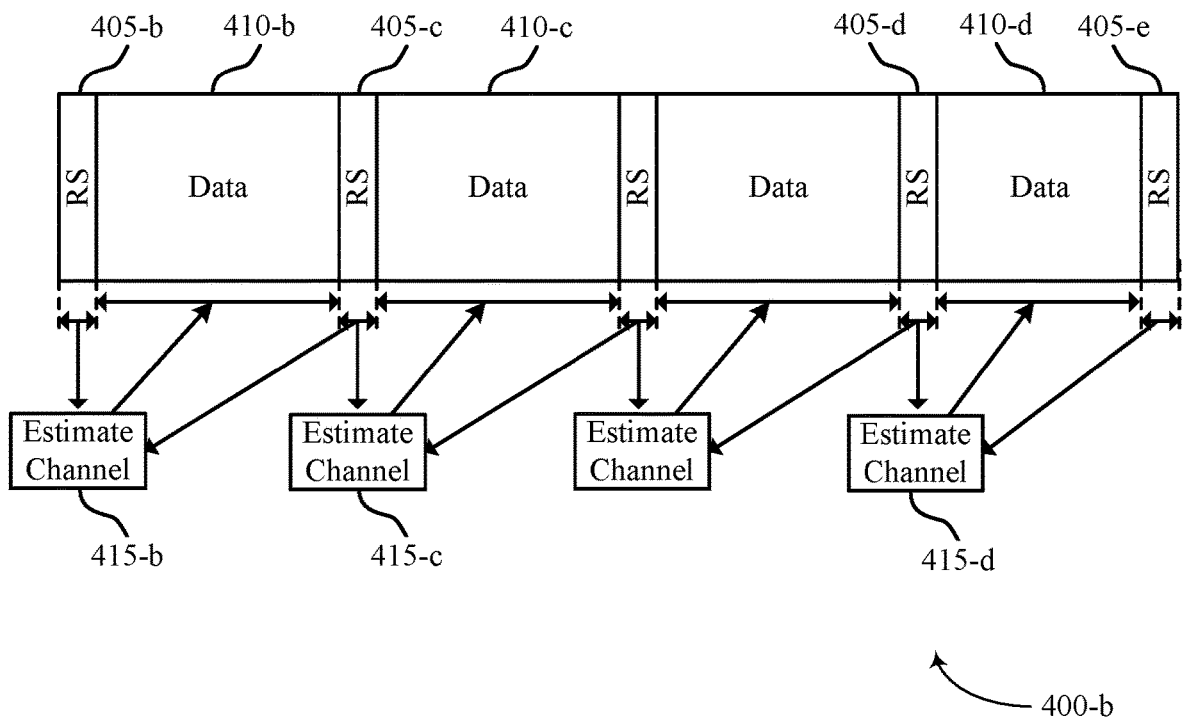

FIG. 4B illustrates an example of a wireless channel estimation configuration 400-b that may be used in performing high Doppler channel performance enhancement techniques. In some cases, wireless channel estimation configuration 400-b may represent aspects of wireless channel estimation techniques performed by a UE 115 or base station 105 as described with reference to FIGS. 1-2.

Wireless channel estimation configuration 400-b illustrates an RS pattern with which RSs are used for non-causal channel estimates (e.g., non-causal mode). Wireless channel estimation configuration 400-b may have an RS at the beginning of each TTI. The wireless channel estimation configuration 400-b may further include data portions following each RS 405.

For example, a first TTI may include RS 405-b and data portion 410-b, and a second TT1 may include RS 405-c and data portion 410-c. RS 405-b and RS 405-c may be used to make a channel estimate 415-b (e.g., interpolation of channel estimates). Channel estimate 415-b may be used to demodulate or decode the intermediate data portion 410-b (e.g., the data portion 410-b of the first TTI between RS

405-*b* and RS 405-*c*). Subsequently, RS 405-*c* and the RS of the next TTI may be used to make a channel estimate 415-*c* (e.g., interpolation of channel estimates). Channel estimate 415-*c* may be used to demodulate or decode the intermediate data portion 410-*c*.

In some examples, a last TTI may include RS 405-*d*, data portion 410-*d*, and RS 405-*e*. In this manner, RS 405-*e* is be added to an end of the last TTI in the burst of a particular data transmission. RS 405-*e* may be added to the end of the transmission burst in order to interpolate a channel estimate 415-*d* for the final data portion 410-*d* in the burst. In this regard, an RS pattern used in the non-causal mode can be defined as including at least one TTI that has a different number of RS portions than another TTI in a burst for a particular UE in a given contiguous transmission period (e.g., a predefined DL transmission period or a predefined UL transmission period). In some cases (e.g., when high data rates are employed in DL transmissions), a scheduler may not schedule data in data portion 410-*d* for a UE in the last TTI of a predefined DL transmission period (e.g., as defined by a specific LTE Release) to allow additional time for demodulation and decoding processing data before acknowledgement messages (e.g., ACK/NACK) must be transmitted (e.g., transmitted on a particular UL channel to a base station).

Additionally or alternatively, RS density configuration 300-*b* (as described with respect to FIG. 3B) having multiple RSs and data portions may be utilized in the non-causal channel estimation process described with respect to FIG. 4B. For example, the RS and data portion structure of a last TTI in RS density configuration 300-*b* may be modified to include an additional RS at the end of the last TTI of a burst.

Figure 5A:
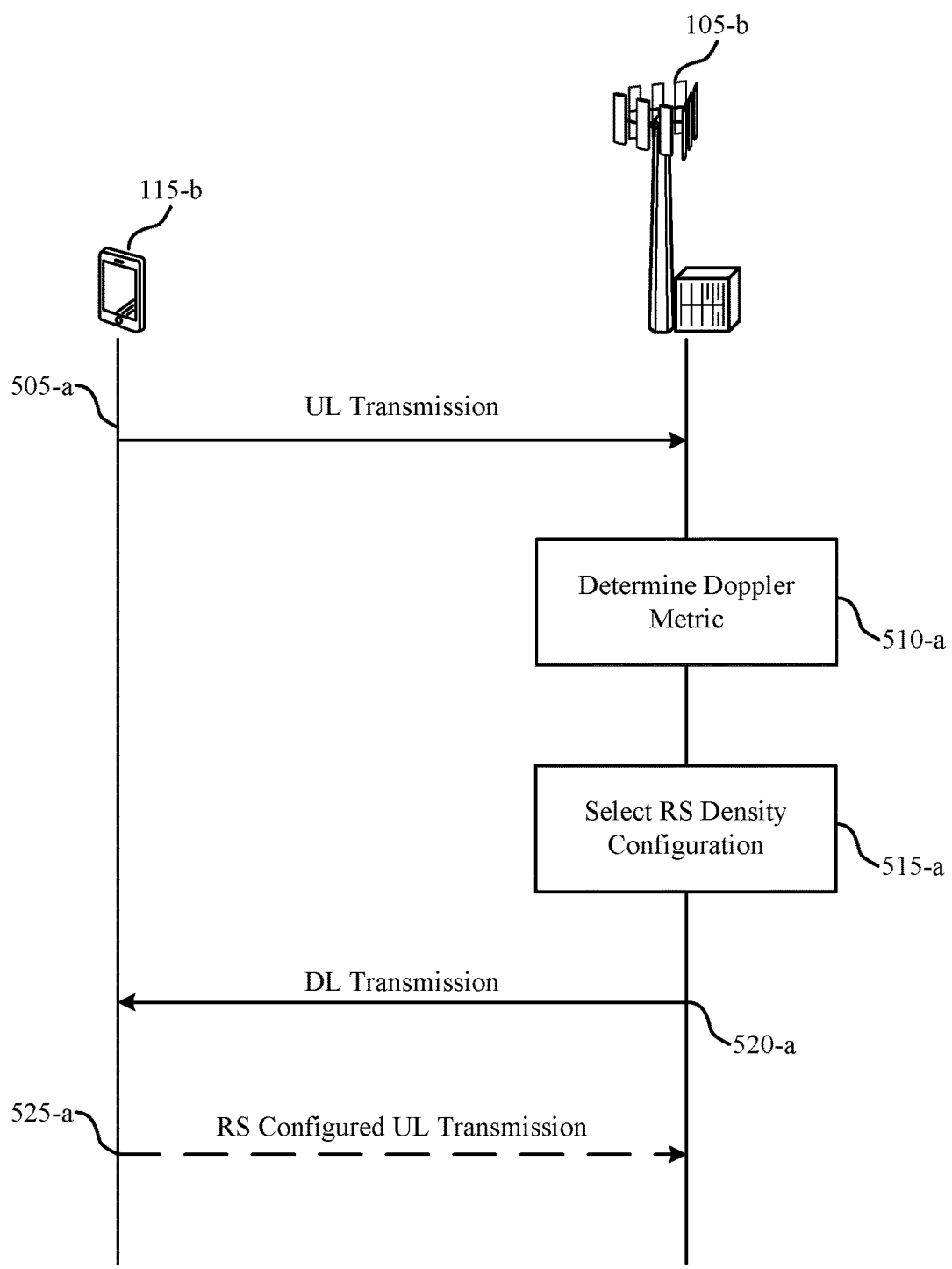
FIGS. 5A and 5B illustrate examples of process flows in systems that support high Doppler channel performance enhancement in accordance with aspects of the present disclosure.

FIG. 5A illustrates an example of a process flow 500-*a* for high Doppler channel performance enhancement in accordance with various aspects of the present disclosure. Process flow 500-*a* may include base station 105-*b* and UE 115-*b*, which may be examples of the corresponding devices described with reference to FIG. 1-2.

At operation 505-*a*, UE 115-*b* may send an UL transmission to base station 105-*b*. The UL transmission may include UL data and/or information related to Doppler effects measured by UE 115-*b*.

At operation 510-*a*, base station 105-*b* may determine a Doppler metric associated with a wireless channel and UE 115-*b*. For example, the Doppler metric may be a determined metric or value such as, but not limited to, metrics or values associated with techniques for calculating Doppler shifts, Doppler spreads, or other useful characteristics related to the Doppler effect. If UE 115-*b* sent UL data in operation 505-*a*, the Doppler metric determination may include measuring Doppler effects associated with UL data received. If the UL transmission of operation 505-*a* included information related to Doppler effects measured by UE 115-*b*, the Doppler metric determination may be based on the received information. In some cases, UE 115-*b* may directly send an indication of the Doppler metric to base station 105-*b* in operation 505-*a*, in which case the determination may entail receiving the Doppler metric.

At operation 515-*a*, base station 105-*b* may select an RS density configuration based at least in part on the Doppler metric determined in operation 510-*a*. The selection of the RS density configuration may include identifying a Doppler classification associated with the Doppler metric from operation 510-*a*, where the Doppler classification is used to select an RS density configuration from a set of RS density configurations. Operation 515-*a* may be repeated any time operation 510-*a* is repeated (e.g., if an additional Doppler metric is determined). For example, if an additional Doppler metric is determined to indicate a higher Doppler shift value than the original Doppler metric, an RS density having more RSs per TTI may be selected.

At operation 520-*a*, base station 105-*b* may send a DL transmission to UE 115-*b*. The DL transmission may include an indication of the RS density configuration selected in operation 515-*a*. The RS density configuration indication may be transmitted via a signaling radio bearer channel or in a resource grant to UE 115-*b*. In some cases, the DL transmission may include a DL data burst that includes RSs and data in accordance with the RS density configuration selected in operation 515-*a*.

In some cases, at operation 525-*a*, UE 115-*b* may optionally transmit an UL data burst including RSs and data in accordance with the RS density configuration selected in operation 515-*a*.

Figure 5B:
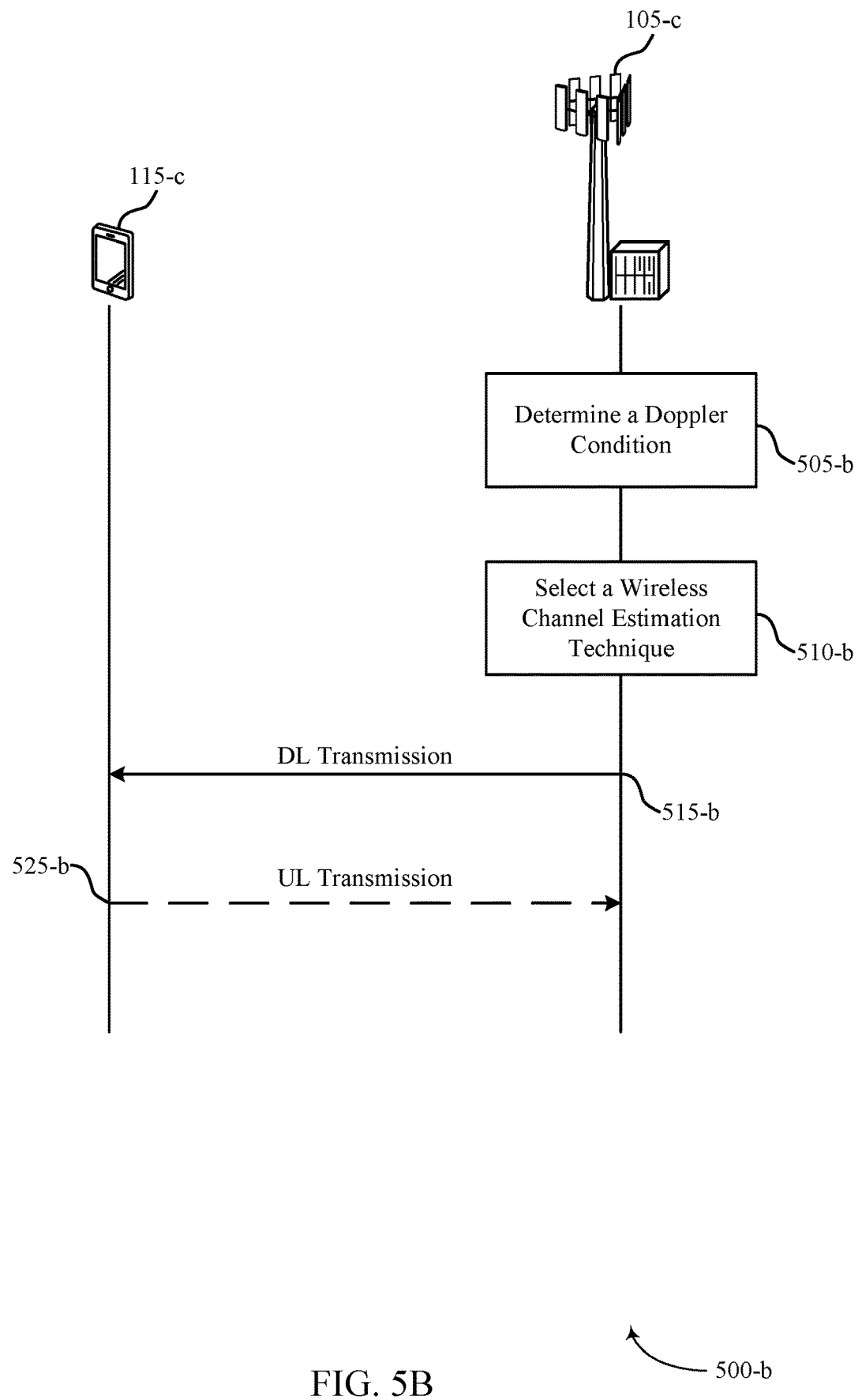

FIG. 5B illustrates an example of a process flow 500-*b* for high Doppler channel performance enhancement in accordance with various aspects of the present disclosure. Process flow 500-*b* may include base station 105-*c* and UE 115-*c*, which may be examples of the corresponding devices described with reference to FIG. 1-2.

At operation 505-*b*, base station 105-*c* may determine a Doppler condition associated with a wireless channel and UE 115-*c*. At operation 510-*b*, base station 105-*c* may select a wireless channel estimation technique from a set of wireless channel estimations techniques based at least in part on the Doppler condition determined in operation 505-*b*. A causal wireless channel estimation technique may be selected if the determined Doppler condition is below a threshold (e.g., satisfies a threshold). In some examples, the Doppler condition can be derived from or related to the Doppler metric, and the threshold can be predetermined as a point at which the Doppler effects may cause data transmission errors for a particular modulation and coding scheme or other transmission characteristic). Alternatively, a non-causal wireless channel estimation technique may be selected if the determined Doppler condition is above the threshold (e.g., satisfies the threshold). In some cases, a first threshold may be used for determining that the Doppler condition is below that first threshold, and a second threshold may be used for determining whether the Doppler condition is above that second threshold. The first and second thresholds may be the same value or different values.

At operation 515-*b*, base station 105-*c* may send a DL transmission to UE 115-*c*. The transmission may include an indication to communicate using the wireless channel estimation technique selected in operation 510-*b*. The indication may be transmitted to UE 115-*c* via a DL signaling radio bearer channel, a resource grant to UE 115-*c*, or bits associated with downlink control information (DCI).

In some cases, the DL transmission may further include a DL data burst including RSs and data such that the data is between two RSs in the last TTI of the DL data burst. In some implementation, a portion of the last TTI of the DL data burst does not include any data for UE 115-*c* to decode.

At operation 525-*b*, UE 115-*c* may send an UL transmission to base station 105-*c*. The UL transmission may include an UL data burst that includes RSs and data such that two sets of RSs are included in a last TTI of the UL data burst. In some cases, the UL transmission may include a request to switch to a non-causal wireless channel estimation technique. The request may be received by base station 105-*c* via an UL signaling radio bearer channel.

Figure 6:
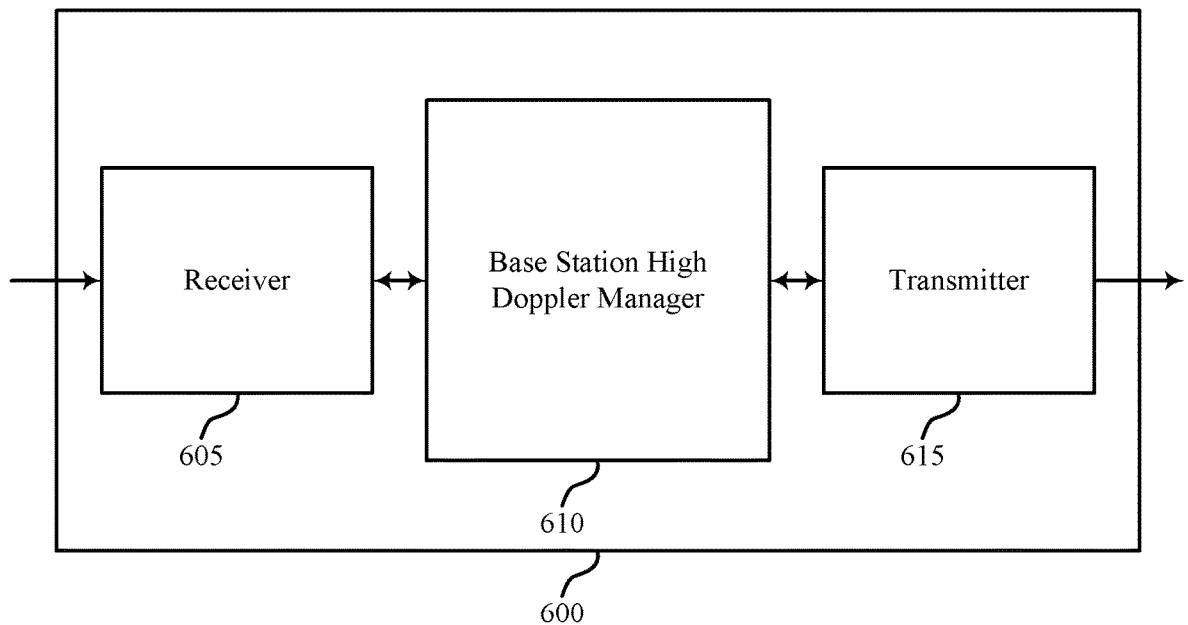
FIGS. 6 through 8 show diagrams of a wireless device that supports high Doppler channel performance enhancement in accordance with aspects of the present disclosure.

FIG. 6 shows a diagram of a wireless device 600 that supports high Doppler channel performance enhancement in accordance with various aspects of the present disclosure. Wireless device 600 may be an example of aspects of a base station 105 described with reference to FIGS. 1 and 2. Wireless device 600 may include receiver 605, base station high Doppler manager 610 and transmitter 615. Wireless device 600 may also include a processor. Each of these components may be in communication with each other.

The receiver 605 may receive information such as packets, user data, or control information associated with various information channels (e.g., control channels, data channels, and information related to high Doppler channel performance enhancement, etc.). Information may be passed on to other components of the device. The receiver 605 may be an example of aspects of the transceiver 925 described with reference to FIG. 9.

The base station high Doppler manager 610 may determine a Doppler condition associated with a wireless channel and a UE, select, from a set of wireless channel estimation techniques and based on the Doppler condition, a wireless channel estimation technique associated with communicating with the UE, and transmit an indication to communicate using the wireless channel estimation technique.

The base station high Doppler manager 610 may also determine a Doppler metric associated with a wireless channel and a UE, select a first reference signal density configuration based on the Doppler metric, and transmit an indication of the first reference signal density configuration. The base station high Doppler manager 610 may also be an example of aspects of the base station high Doppler manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
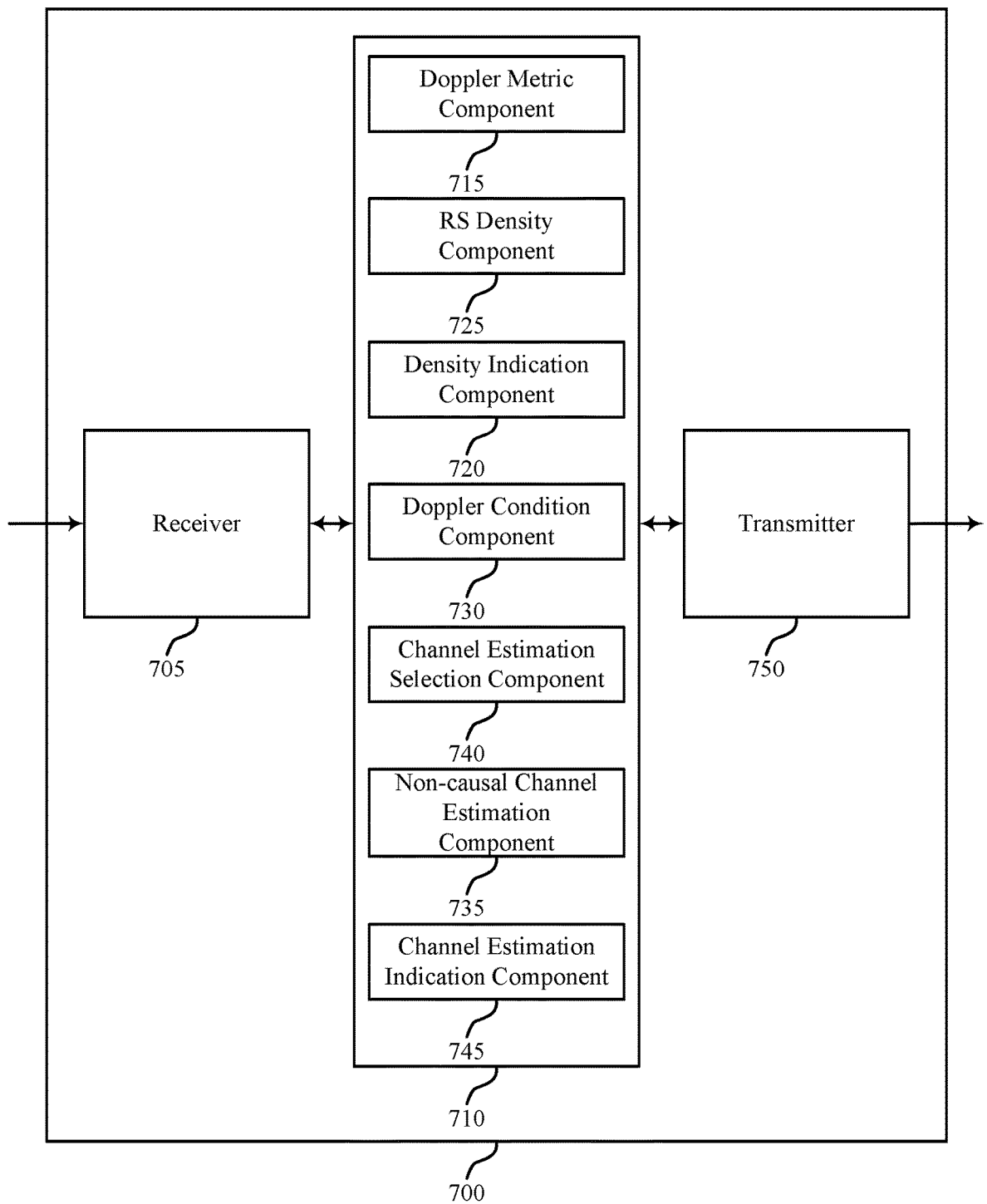

FIG. 7 shows a diagram of a wireless device 700 that supports high Doppler channel performance enhancement in accordance with various aspects of the present disclosure. Wireless device 700 may be an example of aspects of a wireless device 600 or a base station 105 described with reference to FIGS. 1, 2, and 6. Wireless device 700 may include receiver 705, base station high Doppler manager 710 and transmitter 750. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The base station high Doppler manager 710 may be an example of aspects of base station high Doppler manager 610 described with reference to FIG. 6. The base station high Doppler manager 710 may include Doppler metric component 715, density indication component 720, RS density component 725, Doppler condition component 730, non-causal channel estimation component 735, channel estimation selection component 740 and channel estimation indication component 745. The base station high Doppler manager 710 may be an example of aspects of the base station high Doppler manager 905 described with reference to FIG. 9.

The Doppler metric component 715 may determine a Doppler metric. For example, the Doppler metric component 715 may determine the Doppler metric based on the Doppler effects associated with the UL data received from the UE, determine the Doppler metric based on the information related to the Doppler effects measured by the UE, determine an additional Doppler metric associated with the wireless channel and the UE, determine that the additional Doppler metric indicates a higher Doppler shift value than the Doppler metric, and determine a Doppler metric associated with a wireless channel and a UE.

In some cases, determining the Doppler metric includes measuring Doppler effects associated with UL data received from the UE. In some cases, determining the Doppler metric includes receiving information related to Doppler effects measured by the UE. In some cases, determining the Doppler metric includes receiving an indication of the Doppler metric from the UE.

The density indication component 720 may transmit an indication of the first reference signal density configuration. In some cases, transmitting, by the base station to the UE, the indication of the first reference signal density configuration includes transmitting, via a SRB channel, the indication of the first reference signal density configuration. In some cases, transmitting, by the base station to the UE, the indication of the first reference signal density configuration includes transmitting, via a resource grant to the UE, the indication of the first reference signal density configuration.

The RS density component 725 may determine a reference signal density. For example, the RS density component 725 may select a first reference signal density configuration from a set of reference signal density configurations based on the first Doppler classification, determine a second reference signal density configuration based on the additional Doppler metric, the second reference signal density configuration having more reference signals per transmit time interval than the first reference signal density configuration, and select a first reference signal density configuration based on the Doppler metric. In some cases, selecting the first reference signal density configuration includes identifying a first Doppler classification associated with the Doppler metric.

The Doppler condition component 730 may determine a Doppler condition associated with a wireless channel and a UE. The non-causal channel estimation component 735 may select a non-causal wireless channel estimation technique as the wireless channel estimation technique, receive, from the UE, a request to switch to communicating using a non-causal wireless channel estimation technique, and receive, via an UL SRB channel, a request to switch to communicating using the non-causal wireless channel estimation technique. In some cases, selecting the wireless channel estimation technique includes determining that the Doppler condition is above a threshold (e.g., satisfies a threshold).

The channel estimation selection component 740 may select, from a set of wireless channel estimation techniques and, based at least in part on the Doppler condition, a wireless channel estimation technique associated with communicating with the UE.

The channel estimation indication component 745 may transmit an indication to communicate using the wireless channel estimation technique. In some cases, transmitting, by the base station to the UE, the indication to communicate using the wireless channel estimation technique includes transmitting, via a DL SRB channel, the indication to communicate using the wireless channel estimation technique.

In some cases, transmitting, by the base station to the UE, the indication to communicate using the wireless channel estimation technique includes transmitting, via a resource grant to the UE, the indication to communicate using the wireless channel estimation technique. In some cases, transmitting, by the base station to the UE, the indication to communicate using the wireless channel estimation technique includes transmitting, via one or more bits associated with DCI, the indication to communicate using the wireless channel estimation technique.

The transmitter 750 may transmit signals received from other components of wireless device 700. In some examples, the transmitter 750 may be collocated with a receiver in a transceiver module. For example, the transmitter 750 may be an example of aspects of the transceiver 925 described with reference to FIG. 9. The transmitter 750 may utilize a single antenna, or it may utilize a plurality of antennas.

Figure 8:
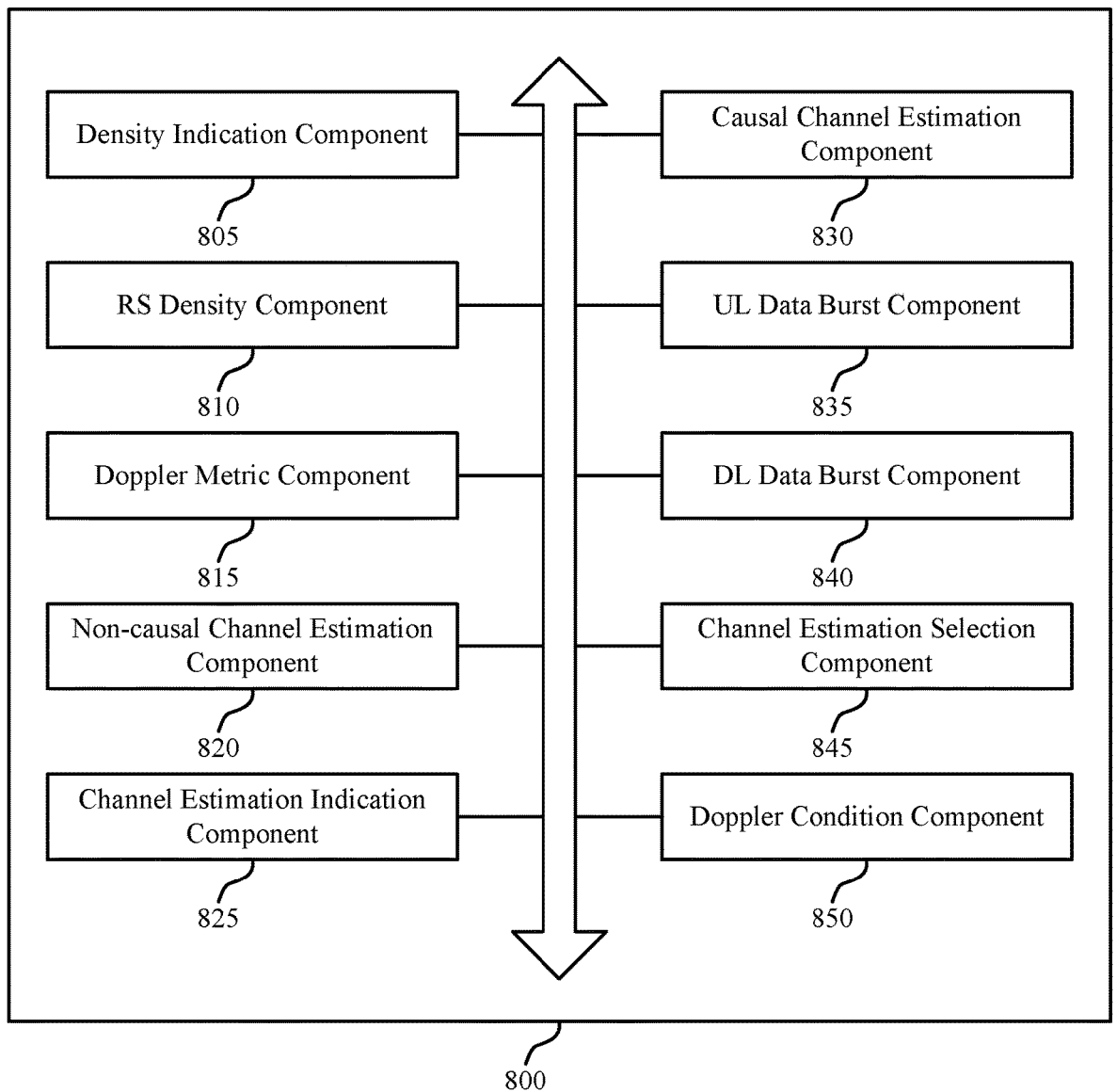

FIG. 8 shows a diagram of a base station high Doppler manager 800 which may be an example of the corresponding component of wireless device 600 or wireless device 700. That is, base station high Doppler manager 800 may be an example of aspects of base station high Doppler manager 610 or base station high Doppler manager 710 described with reference to FIGS. 6 and 7. The base station high Doppler manager 800 may also be an example of aspects of the base station high Doppler manager 905 described with reference to FIG. 9.

The base station high Doppler manager 800 may include density indication component 805, RS density component 810, Doppler metric component 815, non-causal channel estimation component 820, channel estimation indication component 825, causal channel estimation component 830, UL data burst component 835, DL data burst component 840, channel estimation selection component 845 and Doppler condition component 850. Each of these modules may communicate, directly or indirectly, with one another (e.g., via one or more buses).

The density indication component 805 may transmit an indication of the first reference signal density configuration. The RS density component 810 may select the first reference signal density configuration from a set of reference signal density configurations based on the first Doppler classification, determine a second reference signal density configuration based on the additional Doppler metric, the second reference signal density configuration having more reference signals per transmit time interval than the first reference signal density configuration, and select a first reference signal density configuration based on the Doppler metric.

The Doppler metric component 815 may determine a Doppler metric based on the Doppler effects associated with the UL data received from the UE, determine the Doppler metric based on the information related to the Doppler effects measured by the UE, determine an additional Doppler metric associated with the wireless channel and the UE, determine that the additional Doppler metric indicates a higher Doppler shift value than the Doppler metric, and determine a Doppler metric associated with a wireless channel and a UE.

In some cases, determining the Doppler metric includes measuring Doppler effects associated with UL data received from the UE. In some cases, determining the Doppler metric includes receiving information related to Doppler effects measured by the UE. In some cases, determining the Doppler metric includes receiving an indication of the Doppler metric from the UE.

The non-causal channel estimation component 820 may select a non-causal wireless channel estimation technique as the wireless channel estimation technique, receive, from the UE, a request to switch to communicating using a non-causal wireless channel estimation technique, and receive, via an UL SRB channel, a request to switch to communicating using the non-causal wireless channel estimation technique.

The channel estimation indication component 825 may transmit an indication to communicate using the wireless channel estimation technique. The causal channel estimation component 830 may select a causal wireless channel estimation technique as the wireless channel estimation technique.

The UL data burst component 835 may receive an UL data burst including reference signals and data in accordance with the first reference signal density configuration, and receive an UL data burst including reference signals and data such that a first set of reference signals and a second set of reference signals are included in a last TTI of the UL data burst.

The DL data burst component 840 may transmit a DL data burst including reference signals and data such that a first set of reference signals and a second set of reference signals are included in a last TTI of the DL data burst, transmit a DL data burst including reference signals and data such that a last TTI of the DL data burst for the UE is not scheduled in a last TTI of a DL transmission period that includes other UEs, and transmit a DL data burst including reference signals and data in accordance with the first reference signal density configuration.

The channel estimation selection component 845 may select, from a set of wireless channel estimation techniques and based on the Doppler condition, a wireless channel estimation technique associated with communicating with the UE. The Doppler condition component 850 may determine a Doppler condition associated with a wireless channel and a UE.

Figure 9:
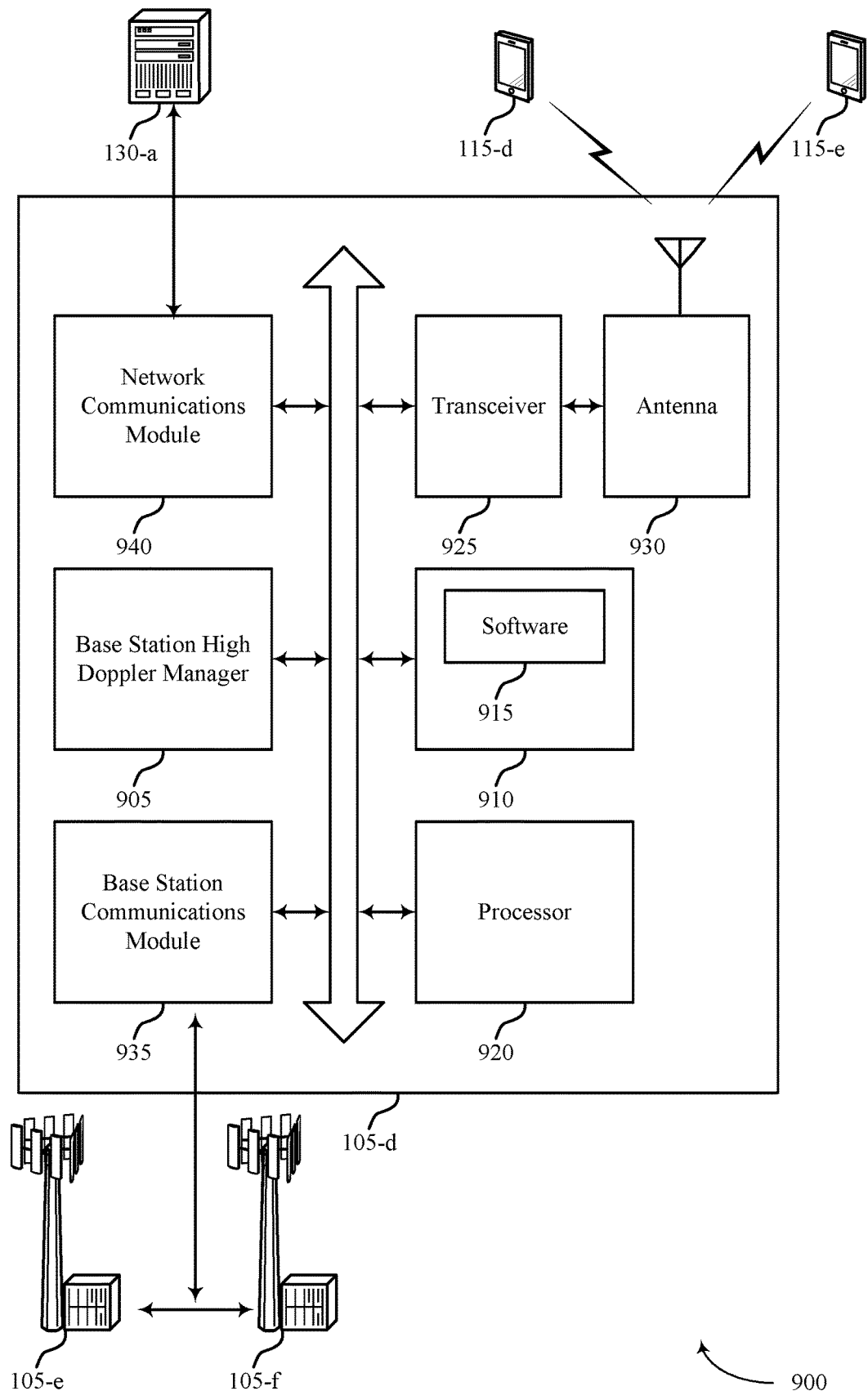
FIG. 9 illustrates a diagram of a system including a base station that supports high Doppler channel performance enhancement in accordance with aspects of the present disclosure.

FIG. 9 shows a diagram of a wireless system 900 including a device configured that supports high Doppler channel performance enhancement in accordance with various aspects of the present disclosure. For example, system 900 may include base station 105-d, which may be an example of a wireless device 600, a wireless device 700, or a base station 105 as described with reference to FIGS. 1, 2 and 6 through 8. Base station 105-d may also include components for bi-directional voice and data communications including components for transmitting communications and components for receiving communications. For example, base station 105-d may communicate bi-directionally with one or more UEs 115.

Base station 105-d may also include base station high Doppler manager 905, memory 910, processor 920, transceiver 925, antenna 930, base station communications module 935 and network communications module 940. Each of these modules may communicate, directly or indirectly, with one another (e.g., via one or more buses). The base station high Doppler manager 905 may be an example of a base station high Doppler manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., high Doppler channel performance enhancement, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described herein. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

The base station communications module 935 may manage communications with other base station 105, and may include a controller or scheduler for controlling communications with UEs 115 in cooperation with other base stations 105. For example, the base station communications module 935 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 940 may manage communications with the core network (e.g., via one or more wired backhaul links). For example, the network communications module 940 may manage the transfer of data communications for client devices, such as one or more UEs 115.

Figure 10:
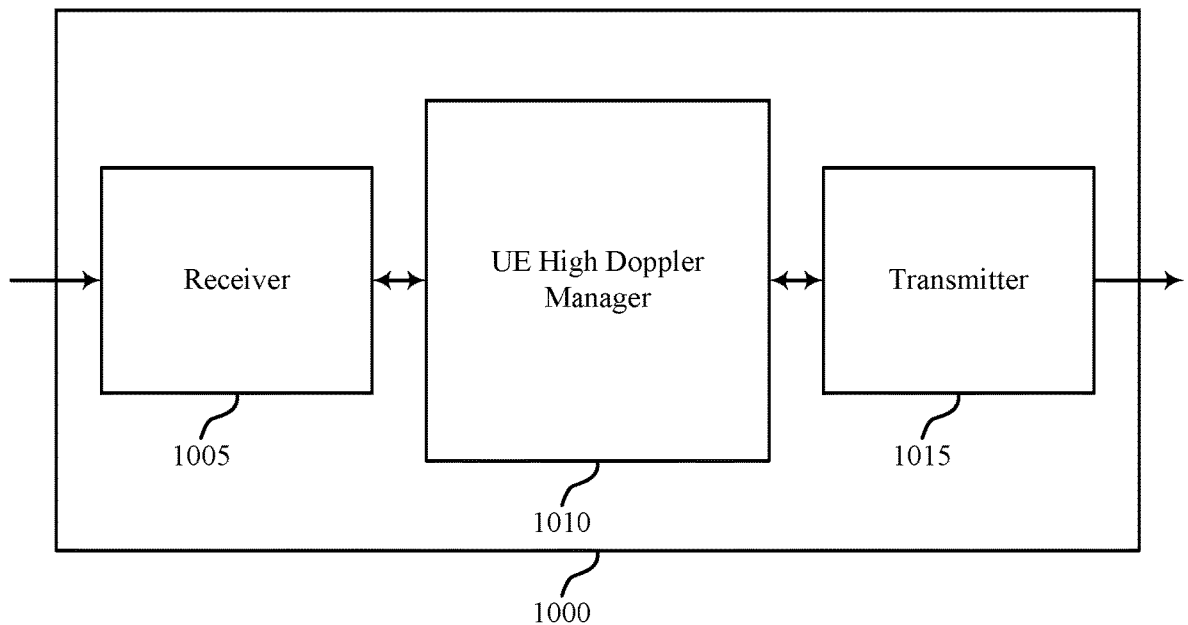
FIGS. 10 through 12 show diagrams of a wireless device that supports high Doppler channel performance enhancement in accordance with aspects of the present disclosure.

FIG. 10 shows a diagram of a wireless device 1000 that supports high Doppler channel performance enhancement in accordance with various aspects of the present disclosure. Wireless device 1000 may be an example of aspects of a UE 115 described with reference to FIGS. 1 and 2. Wireless device 1000 may include receiver 1005, UE high Doppler manager 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to high Doppler channel performance enhancement, etc.). Information may be passed on to other components of the device. The receiver 1005 may be an example of aspects of the transceiver 1325 described with reference to FIG. 13.

The UE high Doppler manager 1010 may receive an indication of a first reference signal density configuration associated with a Doppler metric, and communicate with a base station in accordance with the first reference signal density configuration.

The UE high Doppler manager 1010 may also receive a first indication to communicate using a causal wireless channel estimation technique associated with a first Doppler condition, and determine to switch from the causal wireless channel estimation technique to a non-causal wireless channel estimation technique for communicating with a base station. The UE high Doppler manager 1010 may also be an example of aspects of the UE high Doppler manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
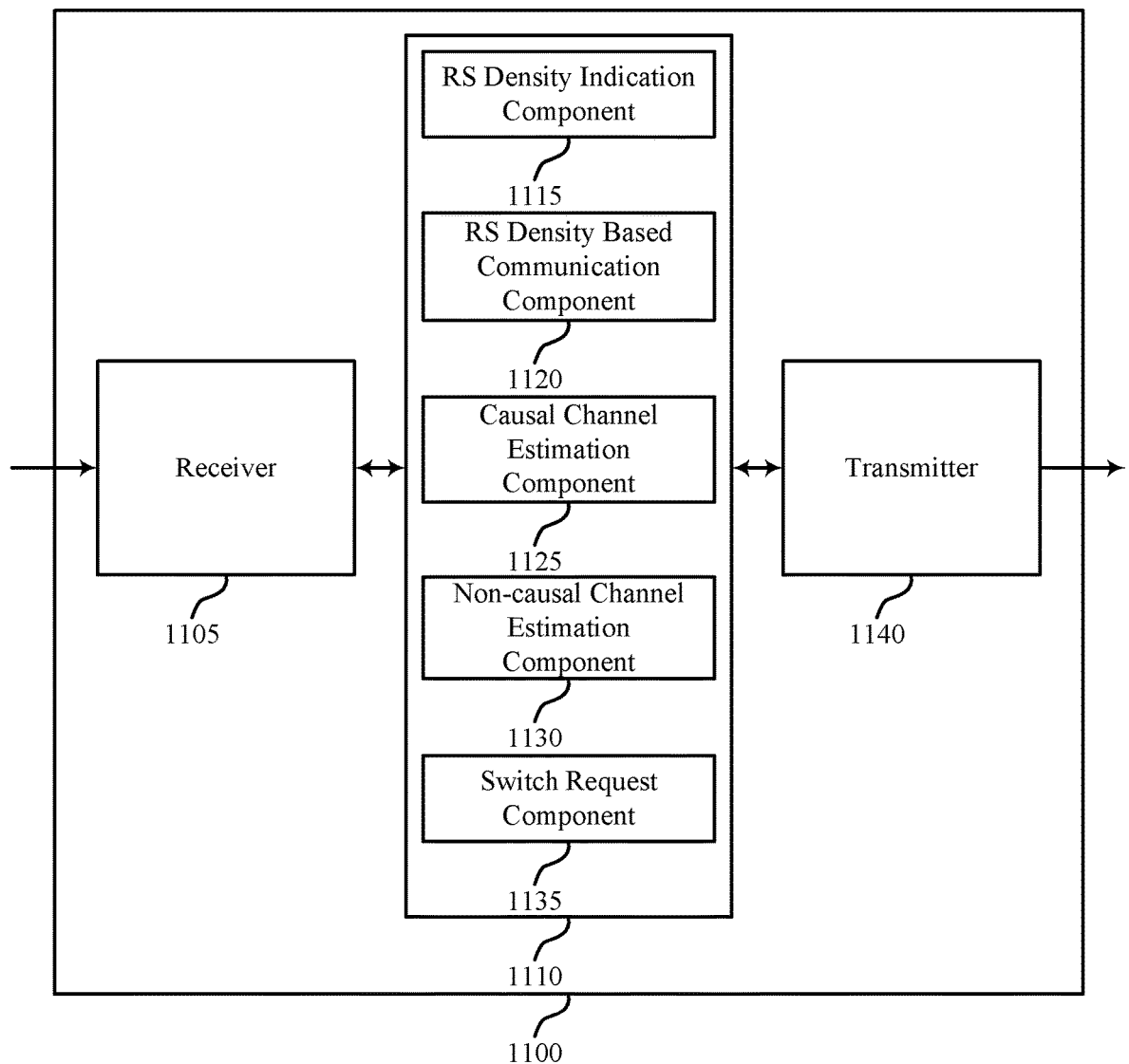

FIG. 11 shows a diagram of a wireless device 1100 that supports high Doppler channel performance enhancement in accordance with various aspects of the present disclosure. Wireless device 1100 may be an example of aspects of a wireless device 1000 or a UE 115 described with reference to FIGS. 1, 2 and 10. Wireless device 1100 may include receiver 1105, UE high Doppler manager 1110 and transmitter 1140. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The UE high Doppler manager 1110 may be an example of aspects of UE high Doppler manager 1010 described with reference to FIG. 10. The UE high Doppler manager 1110 may include RS density indication component 1115, RS density based communication component 1120, causal channel estimation component 1125, non-causal channel estimation component 1130 and switch request component 1135. The UE high Doppler manager 1110 may be an example of aspects of the UE high Doppler manager 1305 described with reference to FIG. 13.

The RS density indication component 1115 may receive an indication of a first reference signal density configuration associated with a Doppler metric. The RS density based communication component 1120 may communicate with a base station in accordance with the first reference signal density configuration.

The causal channel estimation component 1125 may enable communications with a causal channel estimation technique. For example, the causal channel estimation component 1125 may receive a first indication to communicate using a causal wireless channel estimation technique associated with a first Doppler condition. The non-causal channel estimation component 1130 may enable communications using a non-causal channel estimation technique. For example, the non-causal channel estimation component 1130 may determine to switch from the causal wireless channel estimation technique to a non-causal wireless channel estimation technique for communicating with a base station, and switch from the causal wireless channel estimation technique to the non-causal wireless channel estimation technique for communicating with the base station.

In some cases, determining to switch from the causal wireless channel estimation technique to the non-causal wireless channel estimation technique includes receiving a second indication to communicate using the non-causal wireless channel estimation technique associated with a second Doppler condition different from the first Doppler condition. In some cases, determining to switch from the causal wireless channel estimation technique includes determining, based on Doppler effects measured by the UE, that a Doppler condition is above a threshold (e.g., satisfies a threshold), the Doppler condition being associated with a wireless channel and the UE.

In some cases, determining to switch from the causal wireless channel estimation technique includes receiving, from the base station, an indication to communicate using the non-causal wireless channel estimation technique. In some cases, determining to switch from the causal wireless channel estimation technique includes receiving, via a DL SRB channel, an indication to communicate using the non-causal wireless channel estimation technique. In some cases, determining to switch from the causal wireless channel estimation technique includes receiving, via a resource grant from the base station, an indication to communicate using the non-causal wireless channel estimation technique. In some cases, determining to switch from the causal wireless channel estimation technique includes receiving, via one or more bits associated with DCI, an indication to communicate using the non-causal wireless channel estimation technique.

The switch request component 1135 may transmit, by the UE to the base station, a request to switch to communication using the non-causal wireless channel estimation technique, and transmit, via an UL SRB channel, a request to switch to communicating using the non-causal wireless channel estimation technique.

The transmitter 1140 may transmit signals received from other components of wireless device 1100. In some examples, the transmitter 1140 may be collocated with a receiver in a transceiver module. For example, the transmitter 1140 may be an example of aspects of the transceiver 1325 described with reference to FIG. 13. The transmitter 1140 may utilize a single antenna, or it may utilize a plurality of antennas.

Figure 12:
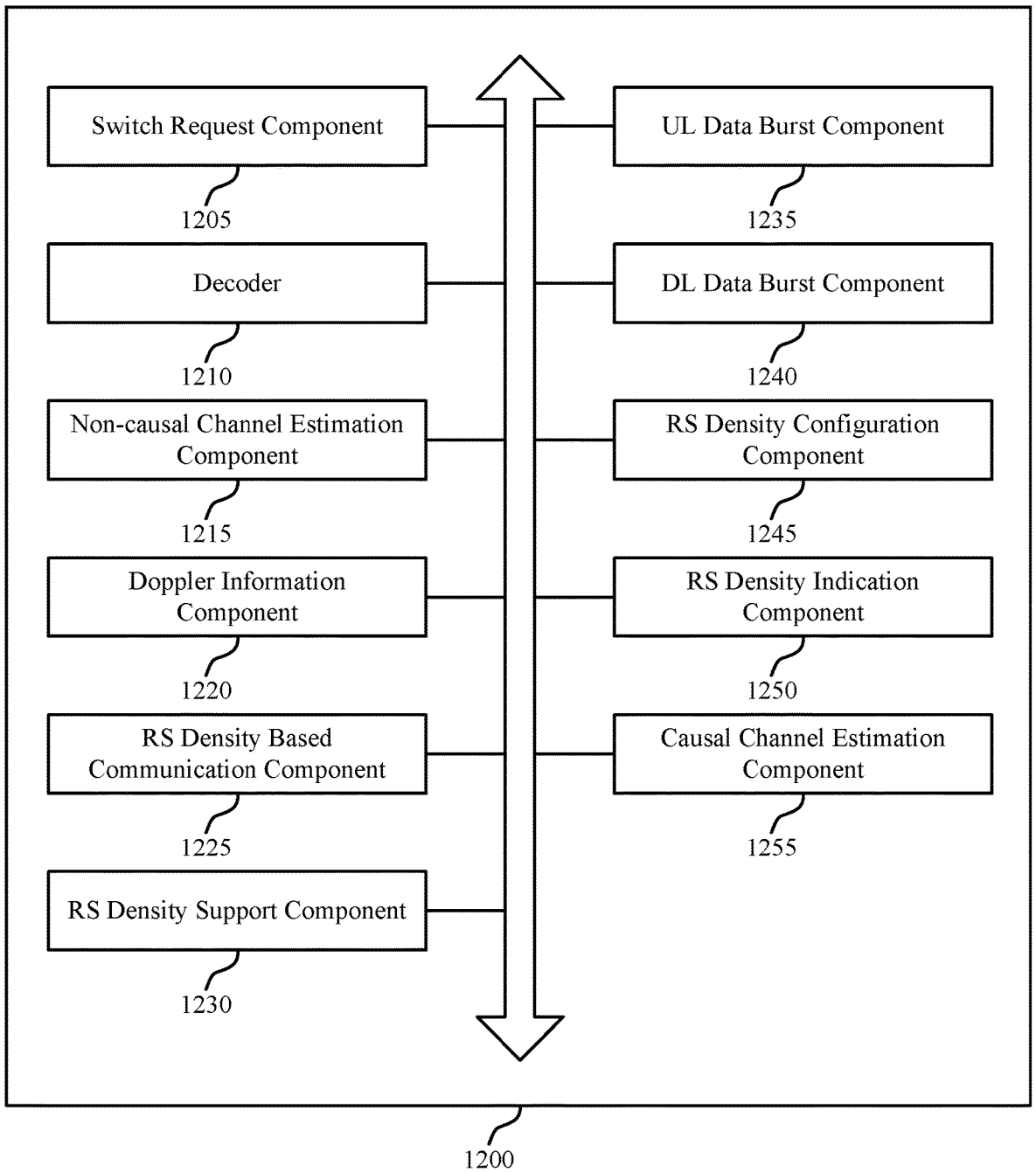

FIG. 12 shows a diagram of a UE high Doppler manager 1200 which may be an example of the corresponding component of wireless device 1000 or wireless device 1100. That is, UE high Doppler manager 1200 may be an example of aspects of UE high Doppler manager 1010 or UE high Doppler manager 1110 described with reference to FIGS. 10 and 11. The UE high Doppler manager 1200 may also be an example of aspects of the UE high Doppler manager 1305 described with reference to FIG. 13.

The UE high Doppler manager 1200 may include switch request component 1205, decoder 1210, non-causal channel estimation component 1215, Doppler information component 1220, RS density based communication component 1225, RS density support component 1230, UL data burst component 1235, DL data burst component 1240, RS density configuration component 1245, RS density indication component 1250 and causal channel estimation component 1255. Each of these modules may communicate, directly or indirectly, with one another (e.g., via one or more buses).

The switch request component 1205 may transmit, by the UE to the base station, a request to switch to communication using the non-causal wireless channel estimation technique, and transmit, via an UL SRB channel, a request to switch to communicating using the non-causal wireless channel estimation technique.

The decoder 1210 may decode the first DL data burst based on the first reference signal density configuration, decode the second DL data burst based on the second reference signal density configuration, decode the first DL data burst using the causal wireless channel estimation technique, and decode the second data burst using the non-causal wireless channel estimation technique.

The non-causal channel estimation component 1215 may determine to switch from the causal wireless channel estimation technique to a non-causal wireless channel estimation technique for communicating with a base station, and switch from the causal wireless channel estimation technique to the non-causal wireless channel estimation technique for communicating with the base station. The Doppler information component 1220 may transmit information related to Doppler effects measured by the UE, and transmit an indication of a first Doppler metric for determining whether to change reference signal density configurations.

The RS density based communication component 1225 may communicate with a base station in accordance with the first reference signal density configuration. The RS density support component 1230 may transmit an indication of one or more supportable reference signal density configurations.

The UL data burst component 1235 may transmit a first UL data burst including reference signals and data in accordance with the causal wireless channel estimation technique, and transmit a second UL data burst including reference signals and data in accordance with the non-causal wireless channel estimation technique. In some cases, communicating with the base station includes transmitting an UL data burst including reference signals and data in accordance with the first reference signal density configuration.

The DL data burst component 1240 may receive a second DL data burst including reference signals and data in accordance with the second reference signal density configuration, receive a first DL data burst including reference signals and data in accordance with the causal wireless channel estimation technique, and receive a second data burst including reference signals and data in accordance with the non-causal wireless channel estimation technique. In some cases, communicating with the base station includes receiving a first downlink data burst including reference signals and data in accordance with the first reference signal density configuration.

The RS density configuration component 1245 may receive an indication of a second reference signal density configuration different from the first reference signal density configuration, the second reference signal density configuration having more reference signals per transmit time interval than the first reference signal density configuration, and transmit an indication of a suggested reference signal density configuration.

The RS density indication component 1250 may receive an indication of a first reference signal density configuration associated with a Doppler metric. The causal channel estimation component 1255 may receive a first indication to communicate using a causal wireless channel estimation technique associated with a first Doppler condition.

Figure 13:
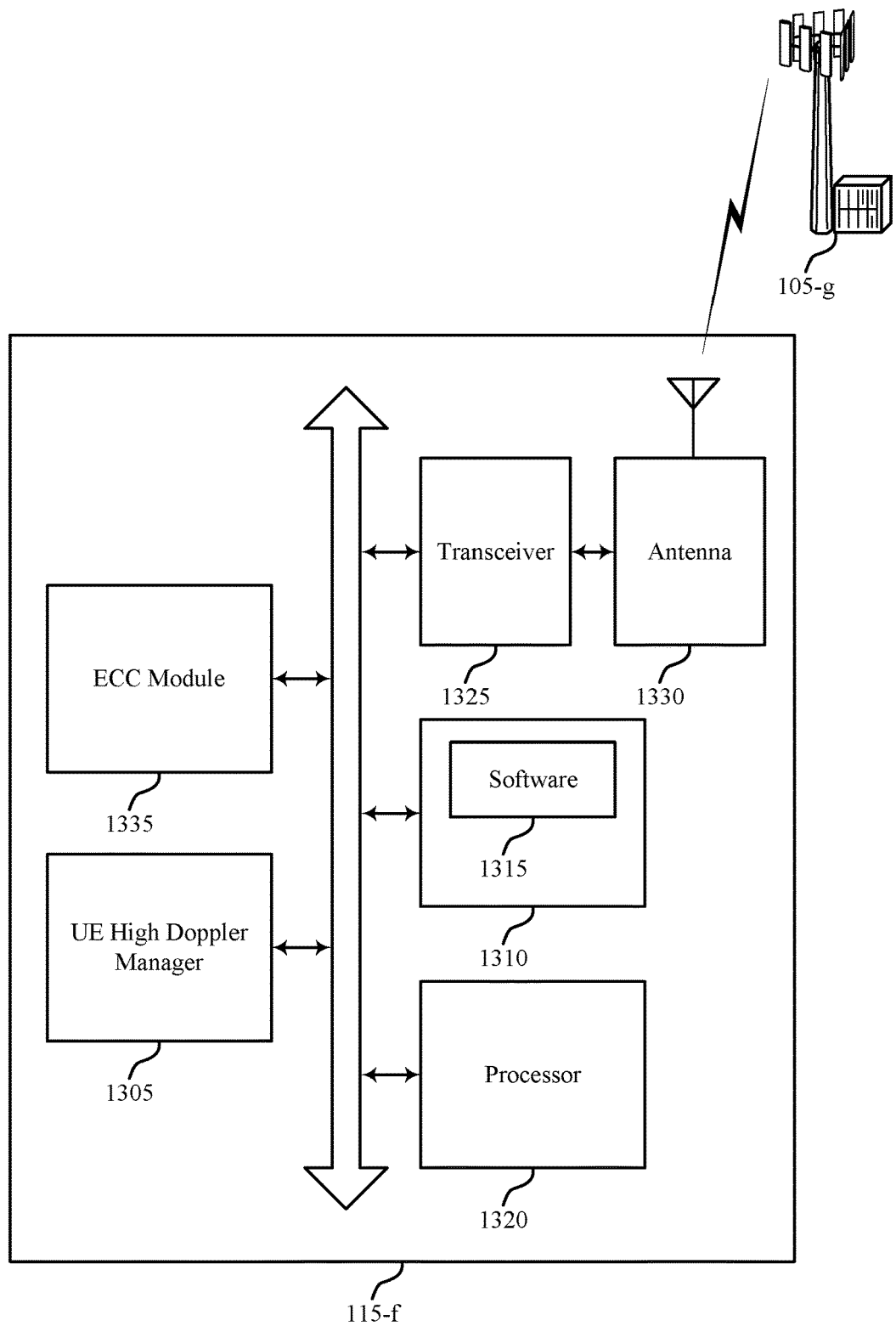
FIG. 13 illustrates a diagram of a system including a user equipment (UE) that supports high Doppler channel performance enhancement in accordance with aspects of the present disclosure.

FIG. 13 shows a diagram of a system 1300 including a device that supports high Doppler channel performance enhancement in accordance with various aspects of the present disclosure. For example, system 1300 may include UE 115-f, which may be an example of a wireless device 1000, a wireless device 1100, or a UE 115 as described with reference to FIGS. 1, 2, and 10 through 12.

UE 115-f may also include UE high Doppler manager 1305, memory 1310, processor 1320, transceiver 1325, antenna 1330 and ECC module 1335. Each of these modules may communicate, directly or indirectly, with one another (e.g., via one or more buses). The UE high Doppler manager 1305 may be an example of a UE high Doppler manager as described with reference to FIGS. 10 through 12.

The memory 1310 may include RAM and ROM. The memory 1310 may store computer-readable, computer-executable software including instructions that, when executed, cause the processor to perform various functions described herein (e.g., high Doppler channel performance enhancement, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described herein. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 930, which may be capable of concurrently transmitting or receiving multiple wireless transmissions.

ECC module 1335 may enable operations using enhanced component carriers (eCCs) such as communication using shared or unlicensed spectrum, using reduced TTIs or subframe durations, or using a large number of component carriers.

Figure 14:
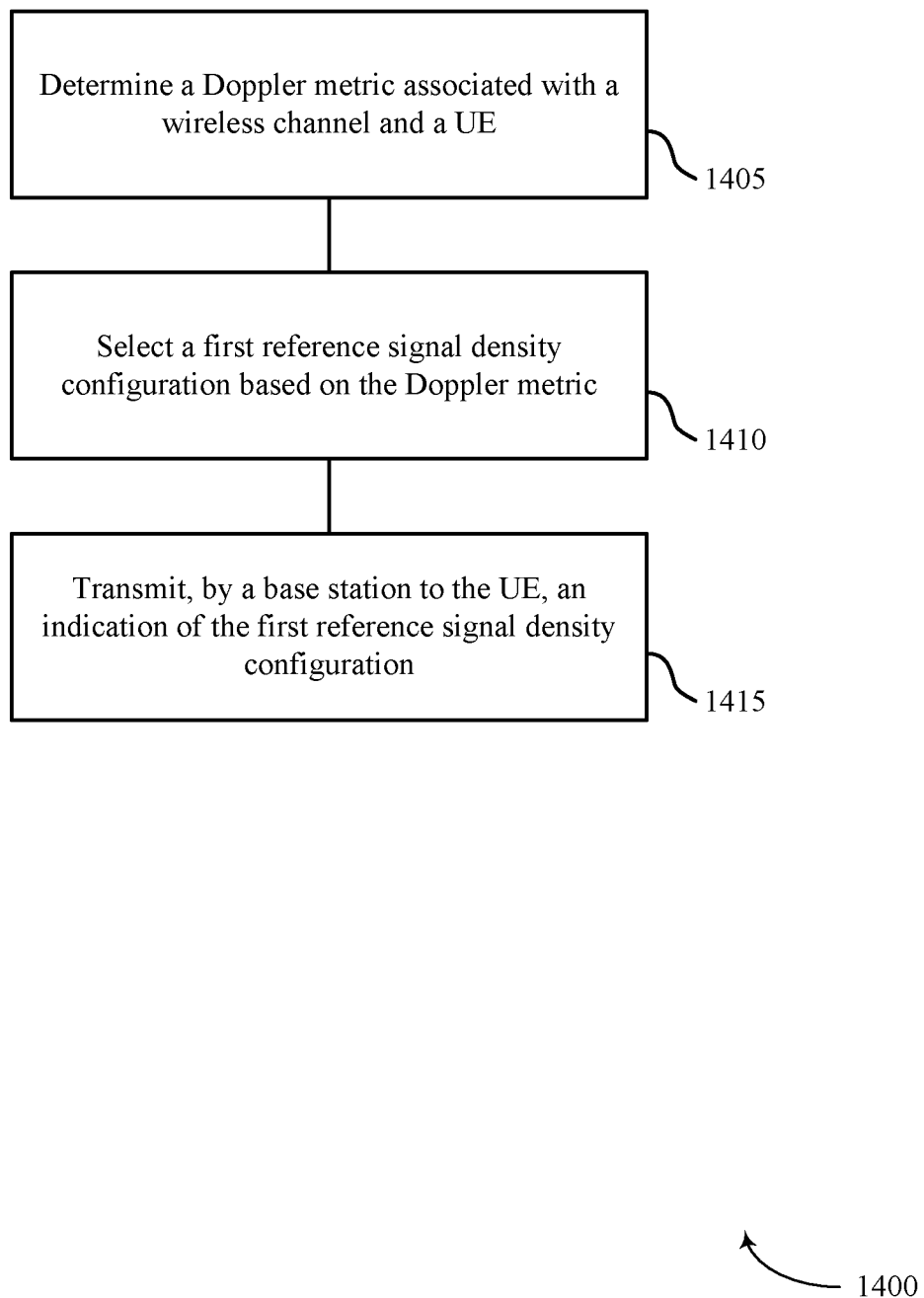
FIGS. 14 through 24 illustrate methods for high Doppler channel performance enhancement in accordance with aspects of the present disclosure.

FIG. 14 shows a flowchart illustrating a method 1400 for high Doppler channel performance enhancement in accordance with various aspects of the present disclosure. The operations of method 1400 may be implemented by a device such as a base station 105 or its components as described with reference to FIGS. 1 and 2. For example, the operations of method 1400 may be performed by the base station high Doppler manager as described herein. In some examples, the base station 105 may execute a set of codes to control the functional elements of the device to perform the functions described below. Additionally or alternatively, the base station 105 may perform aspects the functions described below using special-purpose hardware.

At block 1405, the base station 105 may determine a Doppler metric associated with a wireless channel and a UE as described herein with reference to FIGS. 2 through 5B. In certain examples, the operations of block 1405 may be performed by the Doppler metric component as described with reference to FIGS. 7 and 8.

At block 1410, the base station 105 may select a first reference signal density configuration based on the Doppler metric as described herein with reference to FIGS. 2 through 5B. In certain examples, the operations of block 1410 may be performed by the RS density component as described with reference to FIGS. 7 and 8.

At block 1415, the base station 105 may transmit an indication of the first reference signal density configuration as described herein with reference to FIGS. 2 through 5B. In certain examples, the operations of block 1415 may be performed by the density indication component as described with reference to FIGS. 7 and 8.

Figure 15:
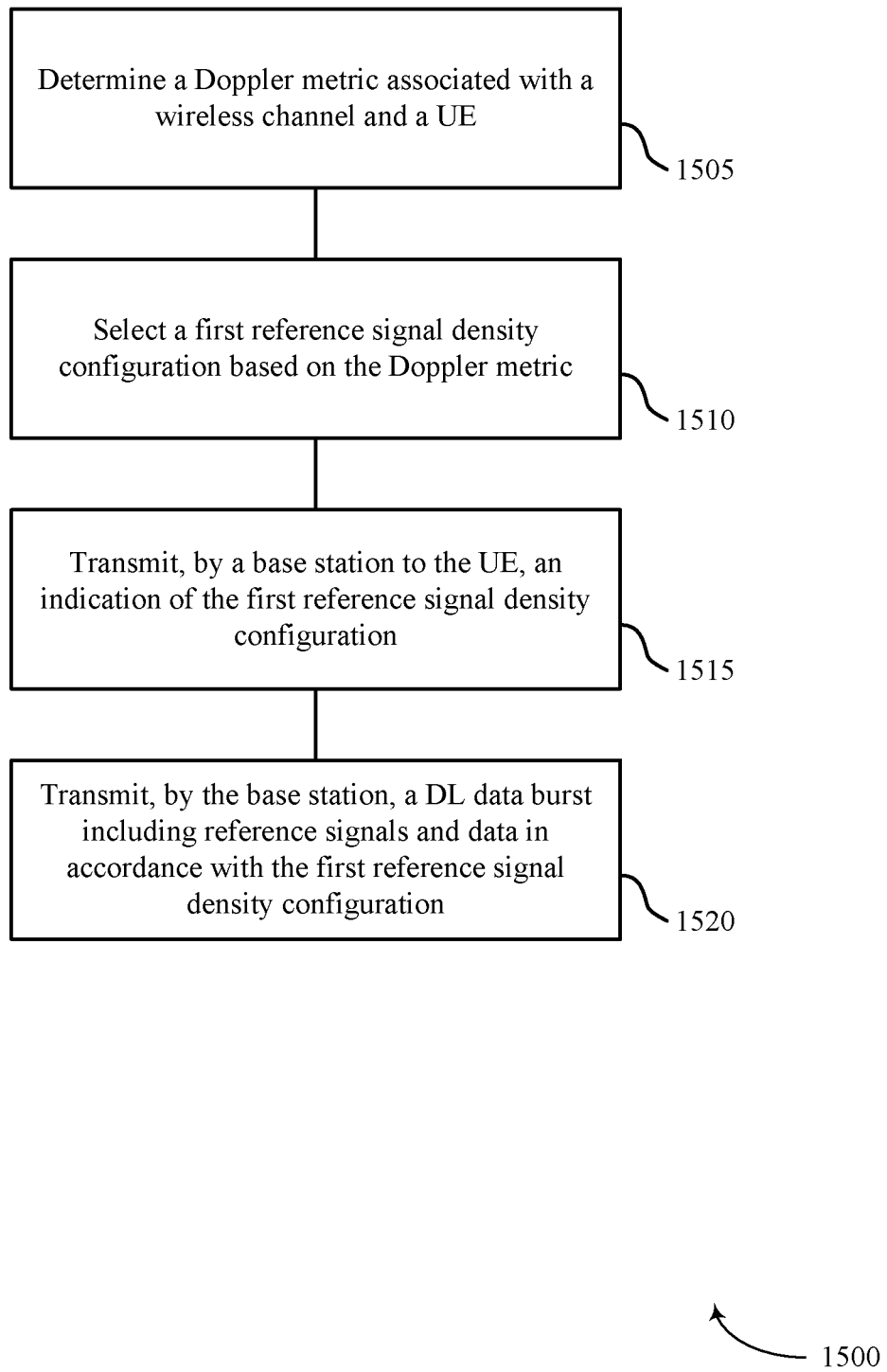

FIG. 15 shows a flowchart illustrating a method 1500 for high Doppler channel performance enhancement in accordance with various aspects of the present disclosure. The operations of method 1500 may be implemented by a device such as a base station 105 or its components as described with reference to FIGS. 1 and 2. For example, the operations of method 1500 may be performed by the base station high Doppler manager as described herein. In some examples, the base station 105 may execute a set of codes to control the functional elements of the device to perform the functions described below. Additionally or alternatively, the base station 105 may perform aspects the functions described below using special-purpose hardware.

At block 1505, the base station 105 may determine a Doppler metric associated with a wireless channel and a UE as described herein with reference to FIGS. 2 through 5B. In certain examples, the operations of block 1505 may be performed by the Doppler metric component as described with reference to FIGS. 7 and 8.

At block 1510, the base station 105 may select a first reference signal density configuration based on the Doppler metric as described herein with reference to FIGS. 2 through 5B. In certain examples, the operations of block 1510 may be performed by the RS density component as described with reference to FIGS. 7 and 8.

At block 1515, the base station 105 may transmit an indication of the first reference signal density configuration as described herein with reference to FIGS. 2 through 5B. In certain examples, the operations of block 1515 may be performed by the density indication component as described with reference to FIGS. 7 and 8.

At block 1520, the base station 105 may transmit a DL data burst including reference signals and data in accordance with the first reference signal density configuration as described herein with reference to FIGS. 2 through 5B. In certain examples, the operations of block 1520 may be performed by the DL data burst component as described with reference to FIGS. 7 and 8.

Figure 16:
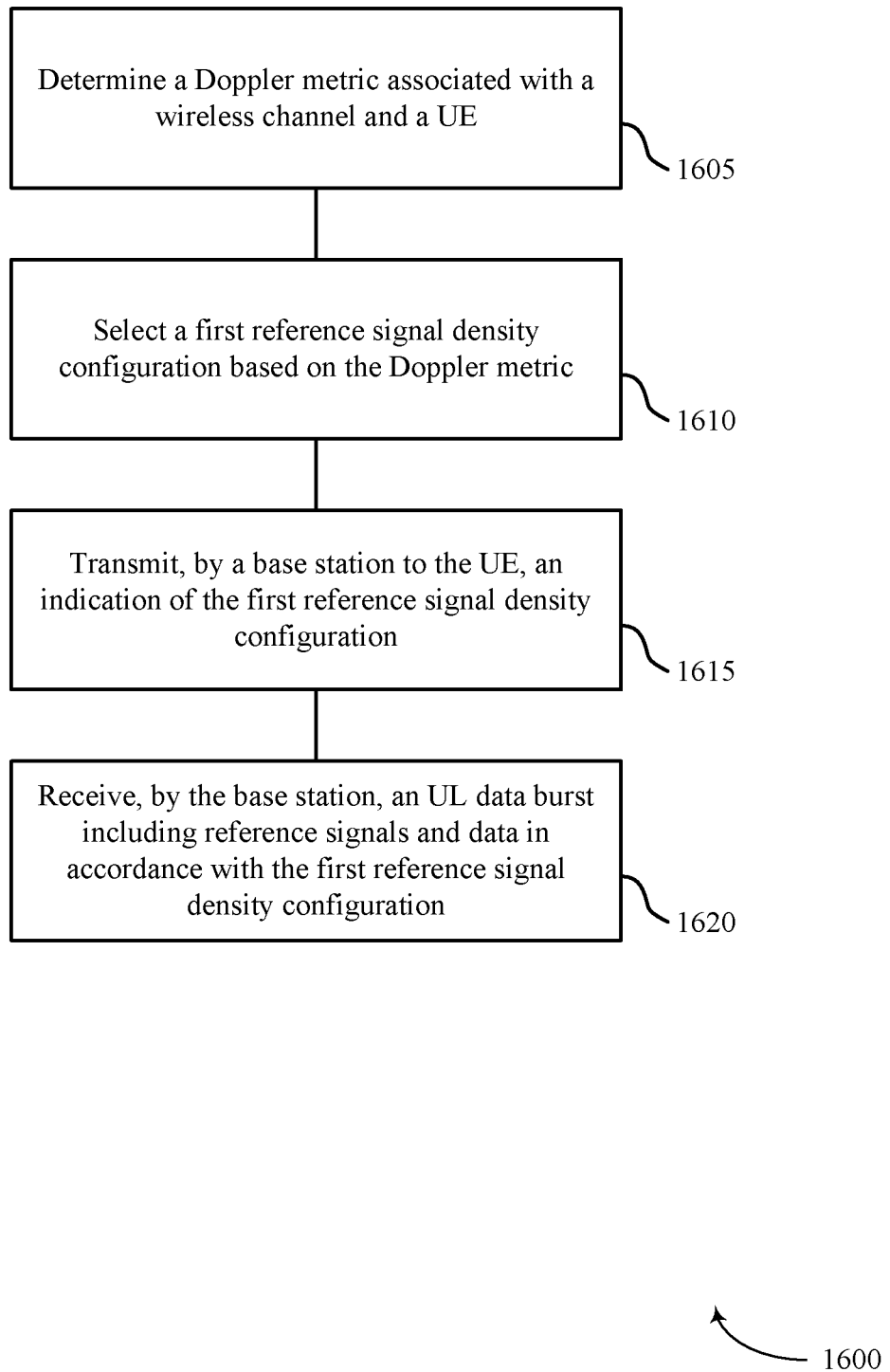

FIG. 16 shows a flowchart illustrating a method 1600 for high Doppler channel performance enhancement in accordance with various aspects of the present disclosure. The operations of method 1600 may be implemented by a device such as a base station 105 or its components as described with reference to FIGS. 1 and 2. For example, the operations of method 1600 may be performed by the base station high Doppler manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may determine a Doppler metric associated with a wireless channel and a UE as described herein with reference to FIGS. 2 through 5B. In certain examples, the operations of block 1605 may be performed by the Doppler metric component as described with reference to FIGS. 7 and 8.

At block 1610, the base station 105 may select a first reference signal density configuration based on the Doppler metric as described herein with reference to FIGS. 2 through 5B. In certain examples, the operations of block 1610 may be performed by the RS density component as described with reference to FIGS. 7 and 8.

At block 1615, the base station 105 may transmit an indication of the first reference signal density configuration as described herein with reference to FIGS. 2 through 5B. In certain examples, the operations of block 1615 may be performed by the density indication component as described with reference to FIGS. 7 and 8.

At block 1620, the base station 105 may receive an UL data burst including reference signals and data in accordance with the first reference signal density configuration as described herein with reference to FIGS. 2 through 5B. In certain examples, the operations of block 1620 may be performed by the UL data burst component as described with reference to FIGS. 7 and 8.

Figure 17:
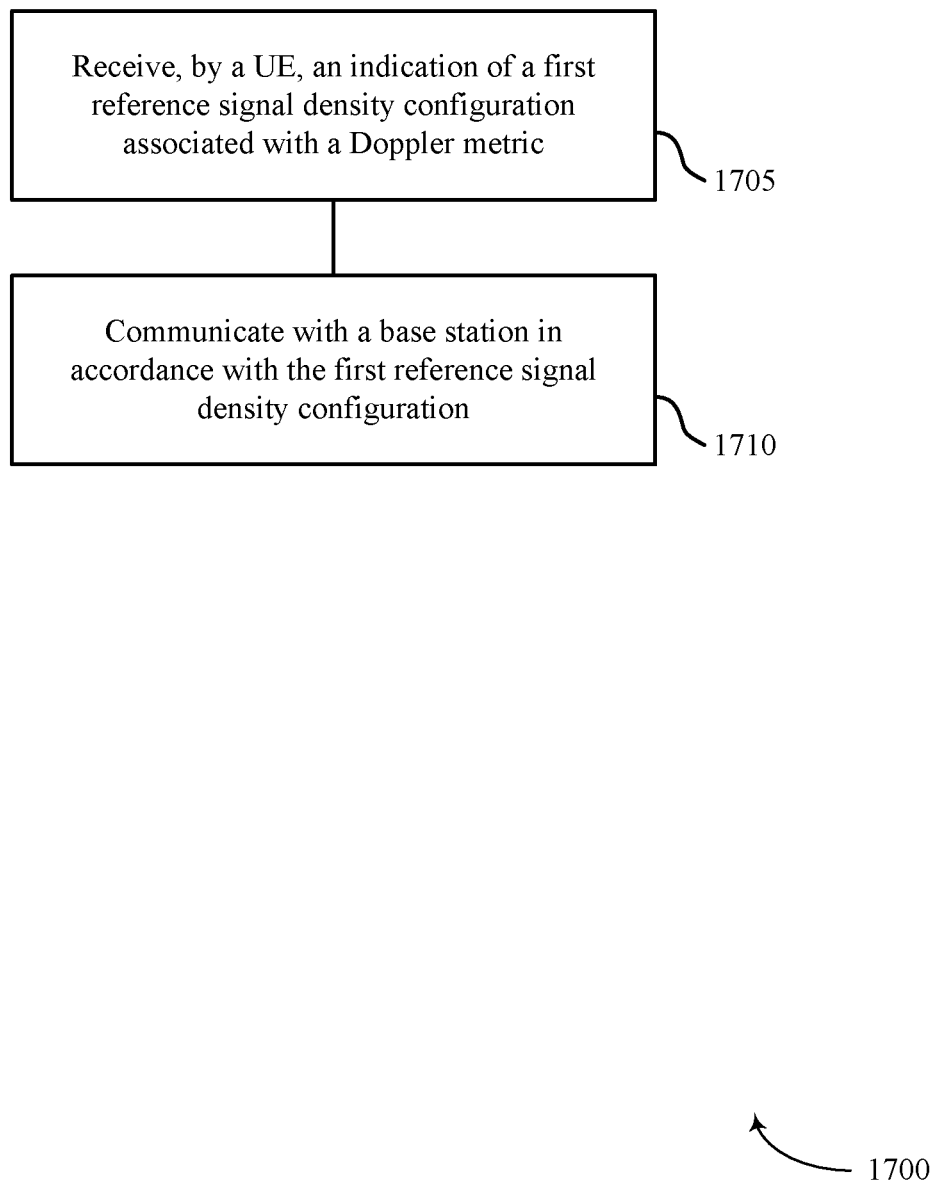

FIG. 17 shows a flowchart illustrating a method 1700 for high Doppler channel performance enhancement in accordance with various aspects of the present disclosure. The operations of method 1700 may be implemented by a device such as a UE 115 or its components as described with reference to FIGS. 1 and 2. For example, the operations of method 1700 may be performed by the UE high Doppler manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive an indication of a first reference signal density configuration associated with a Doppler metric as described herein with reference to FIGS. 2 through 5B. In certain examples, the operations of block 1705 may be performed by the RS density indication component as described with reference to FIGS. 11 and 12.

At block 1710, the UE 115 may communicate with a base station in accordance with the first reference signal density configuration as described herein with reference to FIGS. 2 through 5B. In certain examples, the operations of block 1710 may be performed by the RS density based communication component as described with reference to FIGS. 11 and 12.

Figure 18:
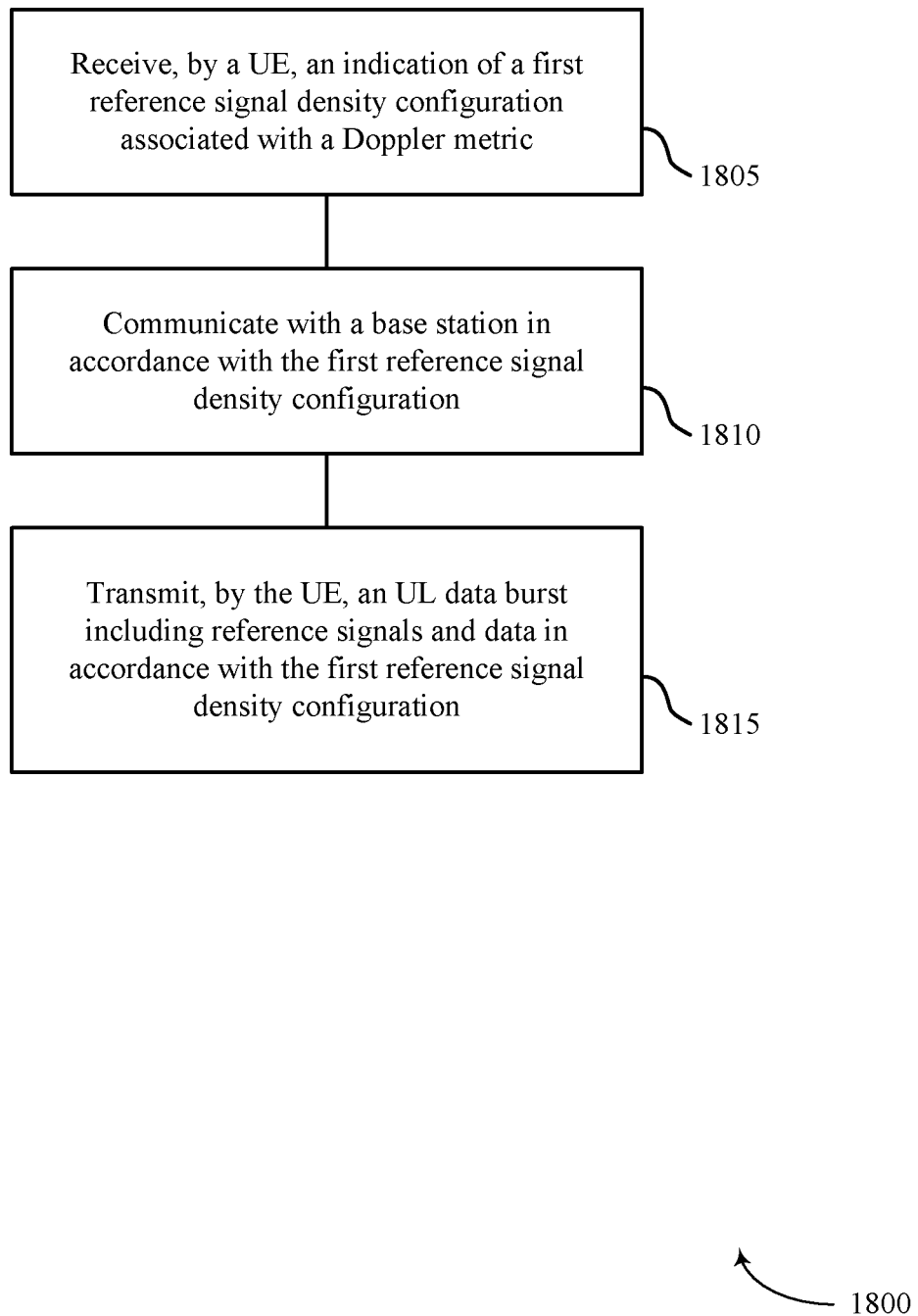

FIG. 18 shows a flowchart illustrating a method 1800 for high Doppler channel performance enhancement in accordance with various aspects of the present disclosure. The operations of method 1800 may be implemented by a device such as a UE 115 or its components as described with reference to FIGS. 1 and 2. For example, the operations of method 1800 may be performed by the UE high Doppler manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may receive an indication of a first reference signal density configuration associated with a Doppler metric as described herein with reference to FIGS. 2 through 5B. In certain examples, the operations of block 1805 may be performed by the RS density indication component as described with reference to FIGS. 11 and 12.

At block 1810, the UE 115 may communicate with a base station in accordance with the first reference signal density configuration as described herein with reference to FIGS. 2 through 5B. In certain examples, the operations of block 1810 may be performed by the RS density based communication component as described with reference to FIGS. 11 and 12.

At block 1815, the UE 115 may communicating with the base station includes transmitting an UL data burst including reference signals and data in accordance with the first reference signal density configuration as described herein with reference to FIGS. 2 through 5B. In certain examples, the operations of block 1815 may be performed by the UL data burst component as described with reference to FIGS. 11 and 12.

Figure 19:
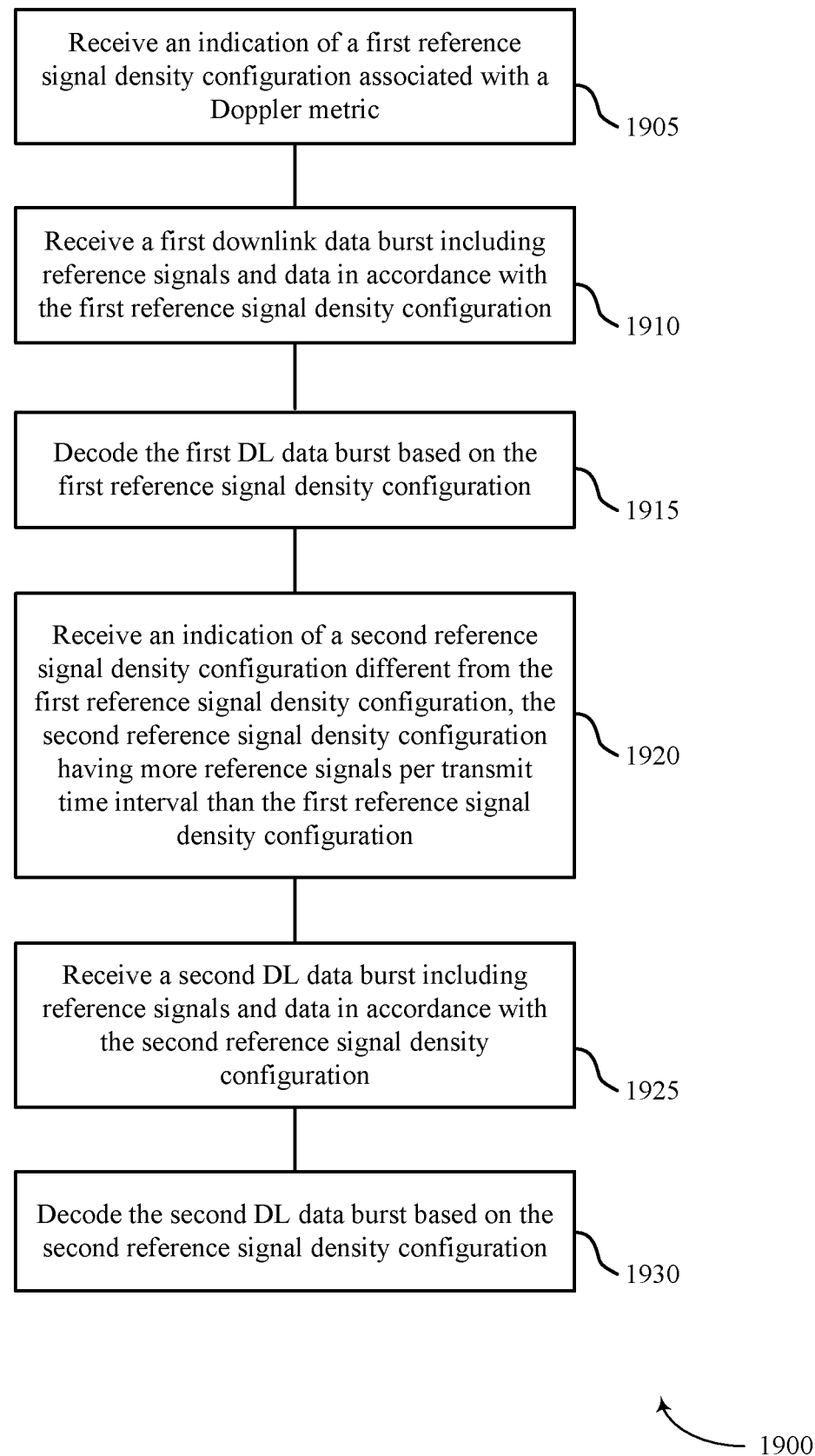

FIG. 19 shows a flowchart illustrating a method 1900 for high Doppler channel performance enhancement in accordance with various aspects of the present disclosure. The operations of method 1900 may be implemented by a device such as a UE 115 or its components as described with reference to FIGS. 1 and 2. For example, the operations of method 1900 may be performed by the UE high Doppler manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may receive an indication of a first reference signal density configuration associated with a Doppler metric as described herein with reference to FIGS. 2 through 5B. In certain examples, the operations of block 1905 may be performed by the RS density indication component as described with reference to FIGS. 11 and 12.

At block 1910, the UE 115 may communicate with a base station in accordance with the first reference signal density configuration as described herein with reference to FIGS. 2 through 5B. In some cases, communicating with the base station includes receiving a first downlink data burst including reference signals and data in accordance with the first reference signal density configuration. In certain examples, the operations of block 1910 may be performed by the RS density based communication component as described with reference to FIGS. 11 and 12.

At block 1915, the UE 115 may decode the first DL data burst based on the first reference signal density configuration as described herein with reference to FIGS. 2 through 5B. In certain examples, the operations of block 1915 may be performed by the decoder as described with reference to FIGS. 11 and 12.

At block 1920, the UE 115 may receive an indication of a second reference signal density configuration different from the first reference signal density configuration, the second reference signal density configuration having more reference signals per transmit time interval than the first reference signal density configuration as described herein with reference to FIGS. 2 through 5B. In certain examples, the operations of block 1920 may be performed by the RS density configuration component as described with reference to FIGS. 11 and 12.

At block 1925, the UE 115 may receive a second DL data burst including reference signals and data in accordance with the second reference signal density configuration as described herein with reference to FIGS. 2 through 5B. In certain examples, the operations of block 1925 may be performed by the DL data burst component as described with reference to FIGS. 11 and 12.

At block 1930, the UE 115 may decode the second DL data burst based on the second reference signal density configuration as described herein with reference to FIGS. 2 through 5B. In certain examples, the operations of block 1930 may be performed by the decoder as described with reference to FIGS. 11 and 12.

Figure 20:
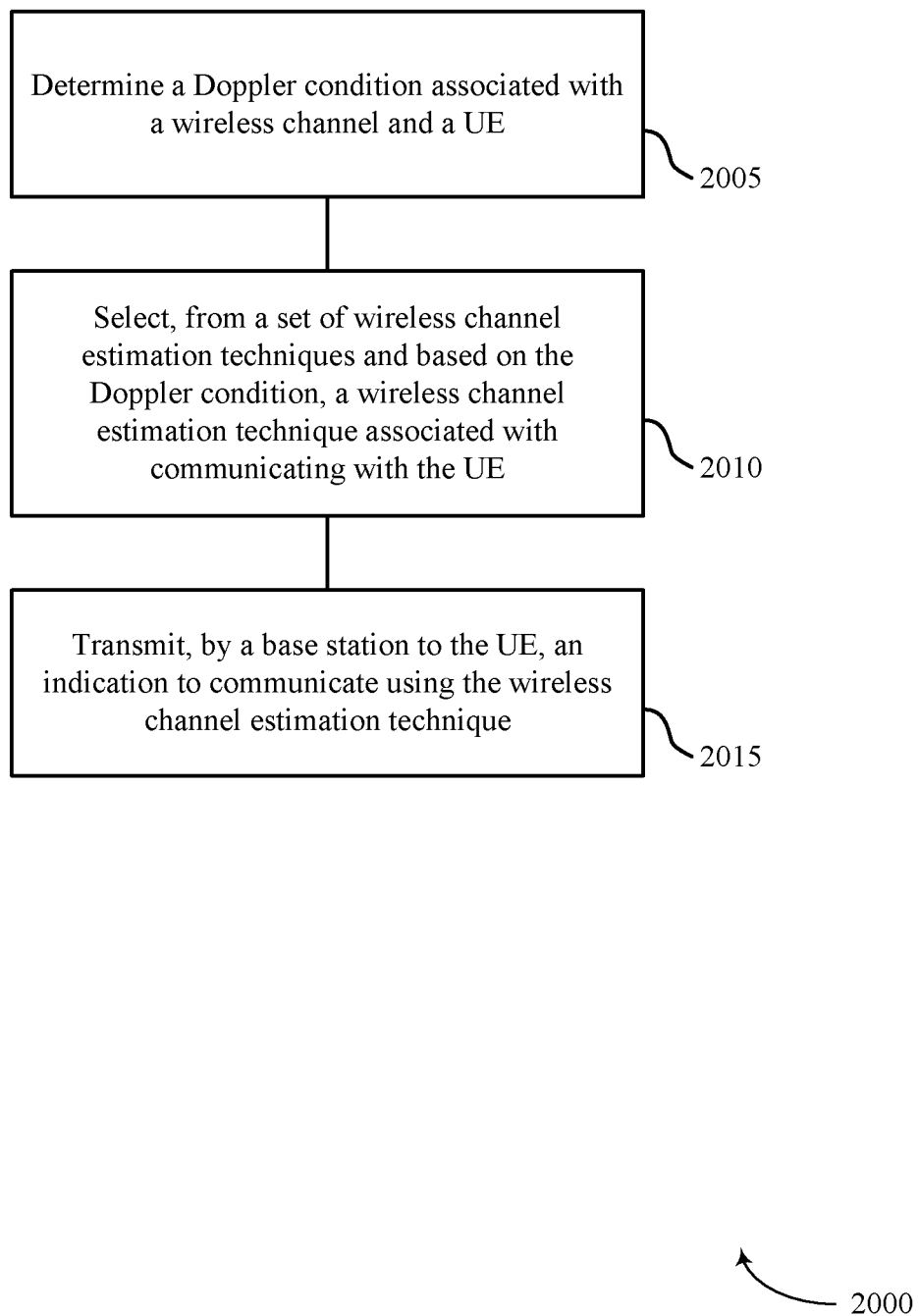

FIG. 20 shows a flowchart illustrating a method 2000 for high Doppler channel performance enhancement in accordance with various aspects of the present disclosure. The operations of method 2000 may be implemented by a device such as a base station 105 or its components as described with reference to FIGS. 1 and 2. For example, the operations of method 2000 may be performed by the base station high Doppler manager as described herein. In some examples, the base station 105 may execute a set of codes to control the functional elements of the device to perform the functions described below. Additionally or alternatively, the base station 105 may perform aspects the functions described below using special-purpose hardware.

At block 2005, the base station 105 may determine a Doppler condition associated with a wireless channel and a UE as described herein with reference to FIGS. 2 through 5B. In certain examples, the operations of block 2005 may be performed by the Doppler condition component as described with reference to FIGS. 7 and 8.

At block 2010, the base station 105 may select, from a set of wireless channel estimation techniques and based on the Doppler condition, a wireless channel estimation technique associated with communicating with the UE as described herein with reference to FIGS. 2 through 5B. In certain examples, the operations of block 2010 may be performed by the channel estimation selection component as described with reference to FIGS. 7 and 8.

At block 2015, the base station 105 may transmit an indication to communicate using the wireless channel estimation technique as described herein with reference to FIGS. 2 through 5B. In certain examples, the operations of block 2015 may be performed by the channel estimation indication component as described with reference to FIGS. 7 and 8.

Figure 21:
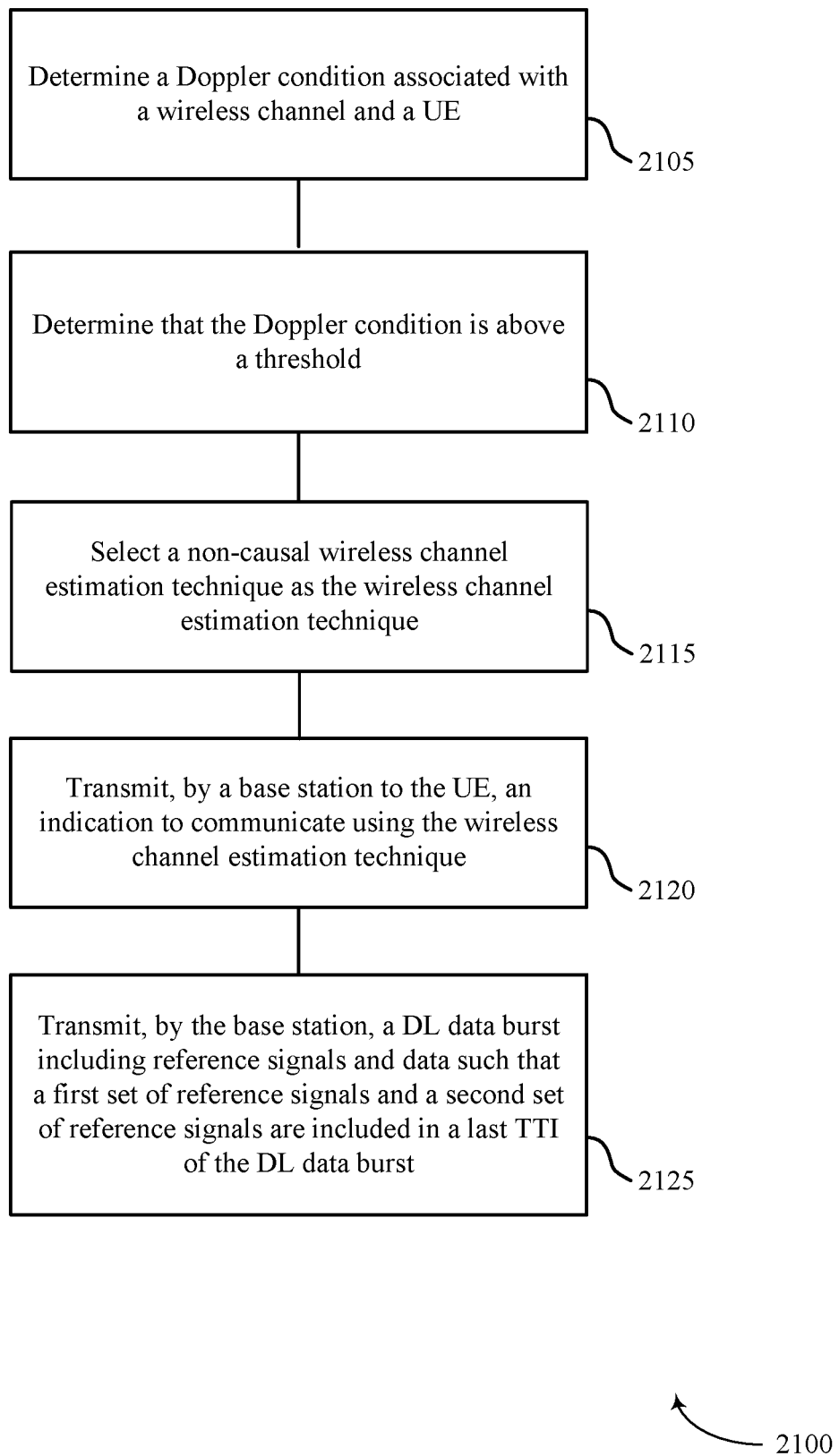

FIG. 21 shows a flowchart illustrating a method 2100 for high Doppler channel performance enhancement in accordance with various aspects of the present disclosure. The operations of method 2100 may be implemented by a device such as a base station 105 or its components as described with reference to FIGS. 1 and 2. For example, the operations of method 2100 may be performed by the base station high Doppler manager as described herein. In some examples, the base station 105 may execute a set of codes to control the functional elements of the device to perform the functions described below. Additionally or alternatively, the base station 105 may perform aspects the functions described below using special-purpose hardware.

At block 2105, the base station 105 may determine a Doppler condition associated with a wireless channel and a UE as described herein with reference to FIGS. 2 through 5B. In certain examples, the operations of block 2105 may be performed by the Doppler condition component as described with reference to FIGS. 7 and 8.

At block 2110, the base station 105 may select, from a set of wireless channel estimation techniques and based on the Doppler condition, a wireless channel estimation technique associated with communicating with the UE as described herein with reference to FIGS. 2 through 5B. In some cases, selecting the wireless channel estimation technique includes determining that the Doppler condition is above a threshold (e.g., satisfies a threshold). In certain examples, the operations of block 2110 may be performed by the channel estimation selection component as described with reference to FIGS. 7 and 8.

At block 2115, the base station 105 may select a non-causal wireless channel estimation technique as the wireless channel estimation technique as described herein with reference to FIGS. 2 through 5B. In certain examples, the operations of block 2115 may be performed by the non-causal channel estimation component as described with reference to FIGS. 7 and 8.

At block 2120, the base station 105 may transmit an indication to communicate using the wireless channel estimation technique as described herein with reference to FIGS. 2 through 5B. In certain examples, the operations of block 2120 may be performed by the channel estimation indication component as described with reference to FIGS. 7 and 8.

At block 2125, the base station 105 may transmit a DL data burst including reference signals and data such that a first set of reference signals and a second set of reference signals are included in a last TTI of the DL data burst as described herein with reference to FIGS. 2 through 5B. In certain examples, the operations of block 2125 may be performed by the DL data burst component as described with reference to FIGS. 7 and 8.

Figure 22:
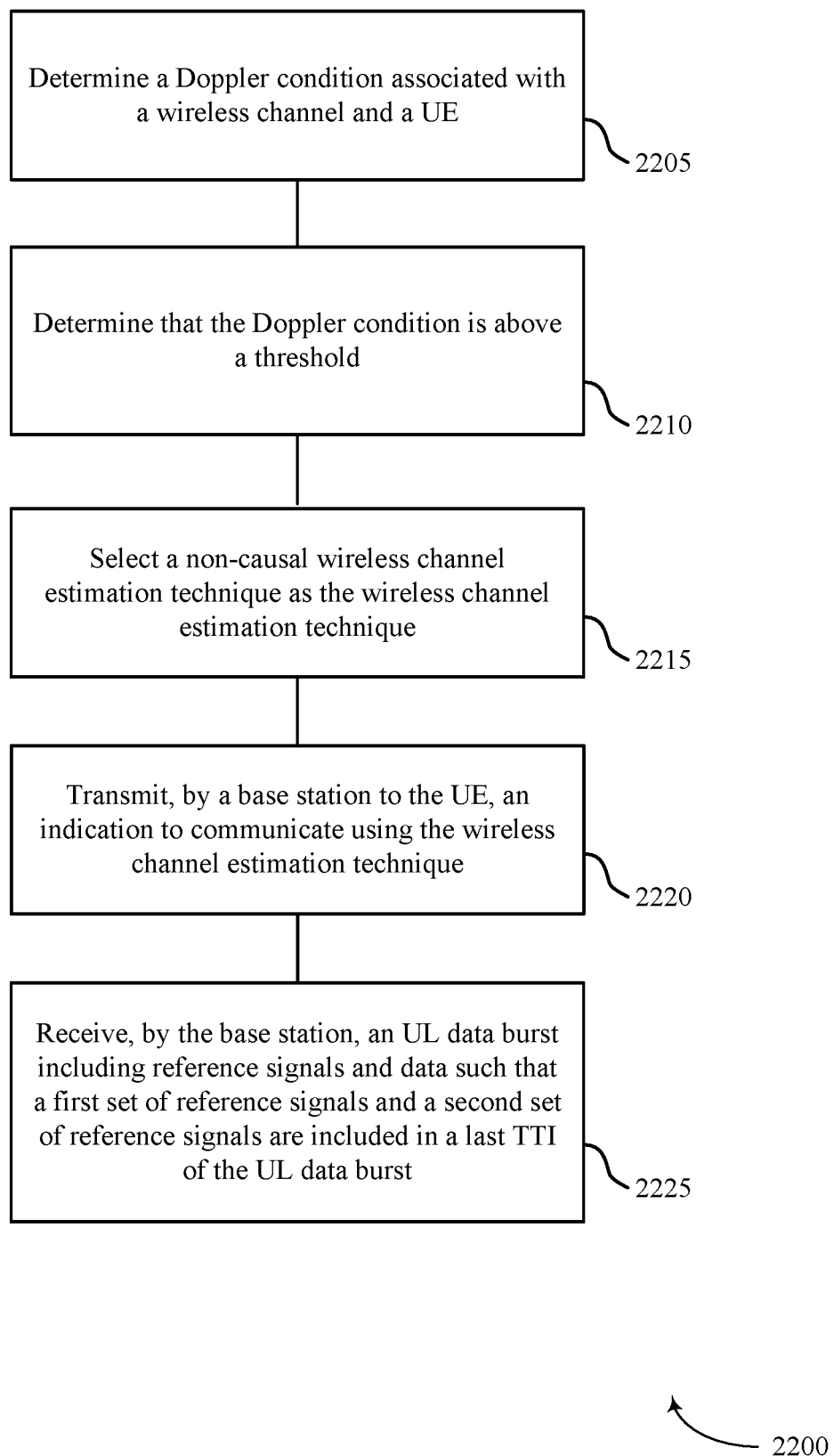

FIG. 22 shows a flowchart illustrating a method 2200 for high Doppler channel performance enhancement in accordance with various aspects of the present disclosure. The operations of method 2200 may be implemented by a device such as a base station 105 or its components as described with reference to FIGS. 1 and 2. For example, the operations of method 2200 may be performed by the base station high Doppler manager as described herein. In some examples, the base station 105 may execute a set of codes to control the functional elements of the device to perform the functions described below. Additionally or alternatively, the base station 105 may perform aspects the functions described below using special-purpose hardware.

At block 2205, the base station 105 may determine a Doppler condition associated with a wireless channel and a UE as described herein with reference to FIGS. 2 through 5B. In certain examples, the operations of block 2205 may be performed by the Doppler condition component as described with reference to FIGS. 7 and 8.

At block 2210, the base station 105 may select, from a set of wireless channel estimation techniques and based on the Doppler condition, a wireless channel estimation technique associated with communicating with the UE as described herein with reference to FIGS. 2 through 5B. In some cases, selecting the wireless channel estimation technique includes determining that the Doppler condition is above a threshold (e.g., satisfies a threshold). In certain examples, the operations of block 2210 may be performed by the channel estimation selection component as described with reference to FIGS. 7 and 8.

At block 2215, the base station 105 may select a non-causal wireless channel estimation technique as the wireless channel estimation technique as described herein with reference to FIGS. 2 through 5B. In certain examples, the operations of block 2215 may be performed by the non-causal channel estimation component as described with reference to FIGS. 7 and 8.

At block 2220, the base station 105 may transmit an indication to communicate using the wireless channel estimation technique as described herein with reference to FIGS. 2 through 5B. In certain examples, the operations of block 2220 may be performed by the channel estimation indication component as described with reference to FIGS. 7 and 8.

At block 2225, the base station 105 may receive an UL data burst including reference signals and data such that a first set of reference signals and a second set of reference signals are included in a last TTI of the UL data burst as described herein with reference to FIGS. 2 through 5B. In certain examples, the operations of block 2225 may be performed by the UL data burst component as described with reference to FIGS. 7 and 8.

Figure 23:
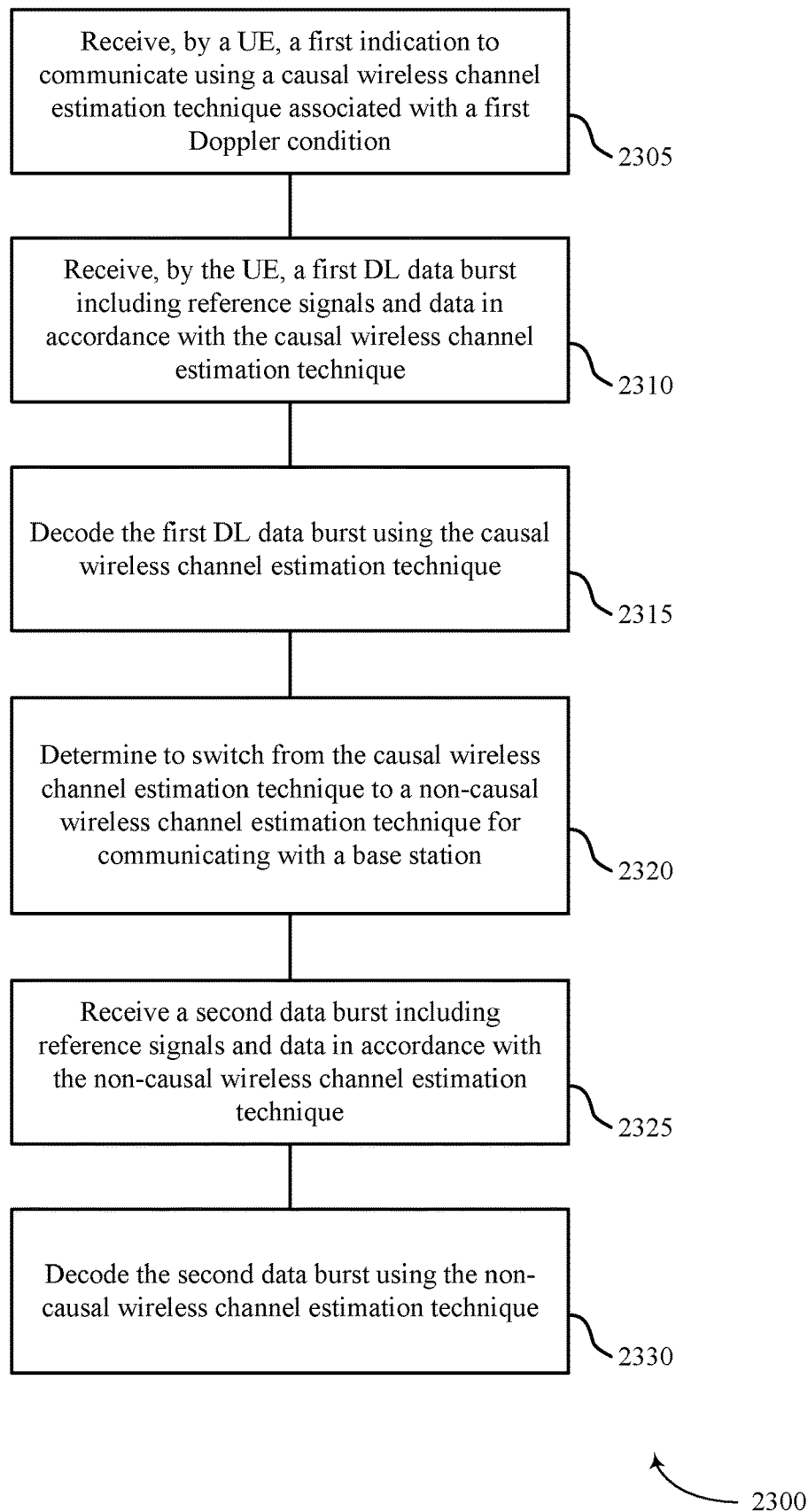

FIG. 23 shows a flowchart illustrating a method 2300 for high Doppler channel performance enhancement in accordance with various aspects of the present disclosure. The operations of method 2300 may be implemented by a device such as a UE 115 or its components as described with reference to FIGS. 1 and 2. For example, the operations of method 2300 may be performed by the UE high Doppler manager as described herein. In some examples, the UE 115 may execute a set of codes to control the functional elements of the device to perform the functions described below. Additionally or alternatively, the UE 115 may perform aspects the functions described below using special-purpose hardware.

At block 2305, the UE 115 may receive a first indication to communicate using a causal wireless channel estimation technique associated with a first Doppler condition as described herein with reference to FIGS. 2 through 5B. In certain examples, the operations of block 2305 may be performed by the causal channel estimation component as described with reference to FIGS. 11 and 12.

At block 2310, the UE 115 may receive a first DL data burst including reference signals and data in accordance with the causal wireless channel estimation technique as described herein with reference to FIGS. 2 through 5B. In certain examples, the operations of block 2310 may be performed by the DL data burst component as described with reference to FIGS. 11 and 12.

At block 2315, the UE 115 may decode the first DL data burst using the causal wireless channel estimation technique as described herein with reference to FIGS. 2 through 5B. In certain examples, the operations of block 2315 may be performed by the decoder as described with reference to FIGS. 11 and 12.

At block 2320, the UE 115 may determine to switch from the causal wireless channel estimation technique to a non-causal wireless channel estimation technique for communicating with a base station as described herein with reference to FIGS. 2 through 5B. In certain examples, the operations of block 2320 may be performed by the non-causal channel estimation component as described with reference to FIGS. 11 and 12.

At block 2325, the UE 115 may receive a second data burst including reference signals and data in accordance with the non-causal wireless channel estimation technique as described herein with reference to FIGS. 2 through 5B. In certain examples, the operations of block 2325 may be performed by the DL data burst component as described with reference to FIGS. 11 and 12.

At block 2330, the UE 115 may decode the second data burst using the non-causal wireless channel estimation technique as described herein with reference to FIGS. 2 through 5B. In certain examples, the operations of block 2330 may be performed by the decoder as described with reference to FIGS. 11 and 12.

Figure 24:
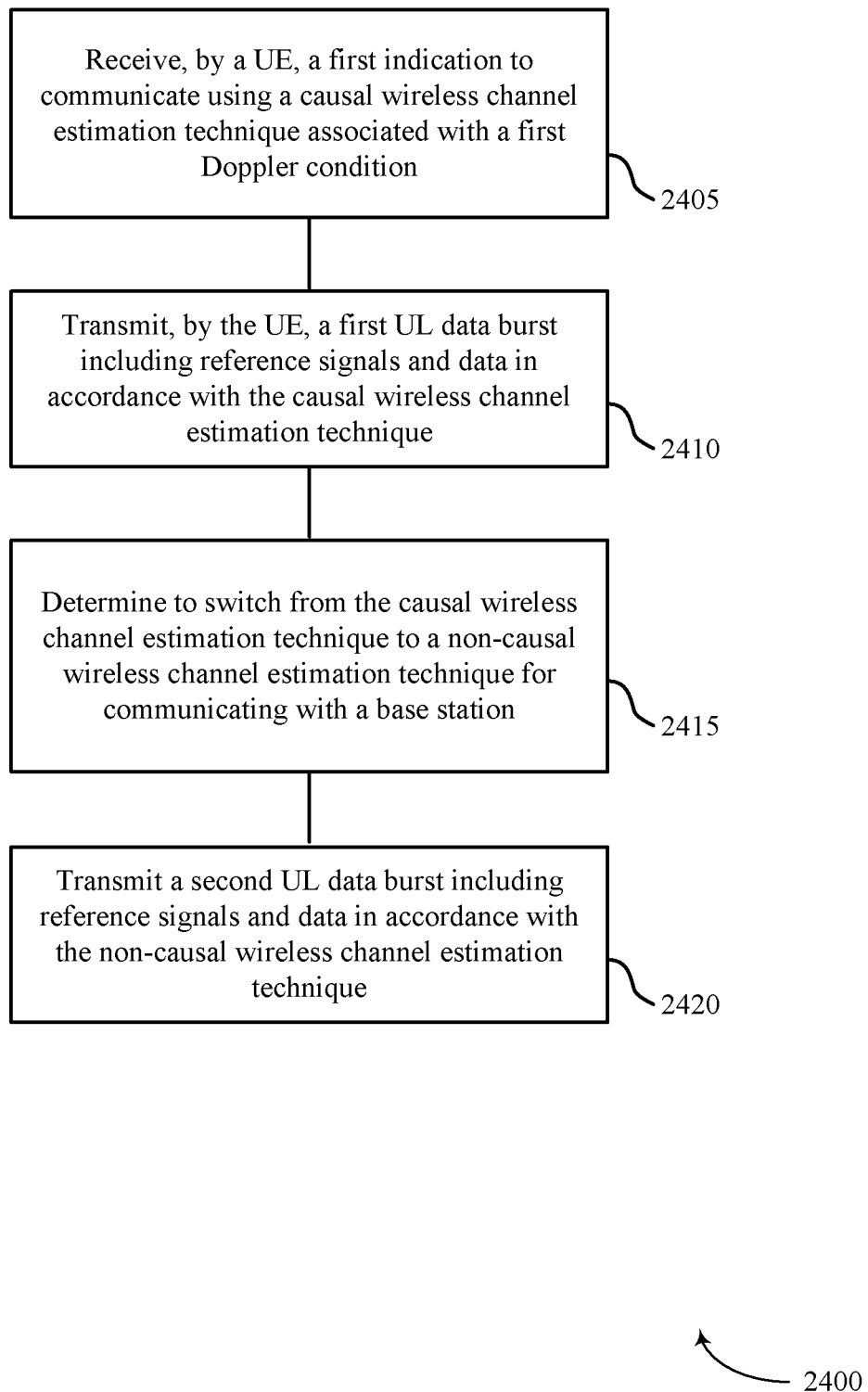

FIG. 24 shows a flowchart illustrating a method 2400 for high Doppler channel performance enhancement in accordance with various aspects of the present disclosure. The operations of method 2400 may be implemented by a device such as a UE 115 or its components as described with reference to FIGS. 1 and 2. For example, the operations of method 2400 may be performed by the UE high Doppler manager as described herein. In some examples, the UE 115 may execute a set of codes to control the functional elements of the device to perform the functions described below. Additionally or alternatively, the UE 115 may perform aspects the functions described below using special-purpose hardware.

At block 2405, the UE 115 may receive a first indication to communicate using a causal wireless channel estimation technique associated with a first Doppler condition as described herein with reference to FIGS. 2 through 5B. In certain examples, the operations of block 2405 may be performed by the causal channel estimation component as described with reference to FIGS. 11 and 12.

At block 2410, the UE 115 may transmit a first UL data burst including reference signals and data in accordance with the causal wireless channel estimation technique as described herein with reference to FIGS. 2 through 5B. In certain examples, the operations of block 2410 may be performed by the UL data burst component as described with reference to FIGS. 11 and 12.

At block 2415, the UE 115 may determine to switch from the causal wireless channel estimation technique to a non-causal wireless channel estimation technique for communicating with a base station as described herein with reference to FIGS. 2 through 5B. In certain examples, the operations of block 2415 may be performed by the non-causal channel estimation component as described with reference to FIGS. 11 and 12.

At block 2420, the UE 115 may transmit a second UL data burst including reference signals and data in accordance with the non-causal wireless channel estimation technique as described herein with reference to FIGS. 2 through 5B. In certain examples, the operations of block 2420 may be performed by the UL data burst component as described with reference to FIGS. 11 and 12.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for high Doppler channel performance enhancement.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for high Doppler channel performance enhancement. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   determining a Doppler metric associated with a wireless channel and a user equipment (UE);
   selecting, from a plurality of reference signal configurations, a first reference signal configuration based at least in part on the Doppler metric, the plurality of reference signal configurations comprising a plurality of reference signal density configurations and a plurality of wireless channel estimation techniques including an extrapolation wireless channel estimation technique; and
   transmitting, by a base station to the UE, an indication of the first reference signal configuration, the indication of the first reference signal configuration indicating a first reference signal density configuration and a wireless channel estimation technique having a wireless channel estimation processing timeline for communicating with the UE.

2. The method of claim 1, further comprising:
   transmitting, by the base station, a downlink data burst including reference signals and data in accordance with the first reference signal density configuration.

3. The method of claim 1, further comprising:
   receiving, by the base station, an uplink data burst including reference signals and data in accordance with the first reference signal density configuration.

4. The method of claim 1, wherein selecting the wireless channel estimation technique comprises:
   determining that the Doppler metric satisfies a first threshold; and
   selecting a causal wireless channel estimation technique as the wireless channel estimation technique.

5. The method of claim 1, wherein selecting the wireless channel estimation technique comprises:
   determining that the Doppler metric satisfies a second threshold; and
   selecting a non-causal wireless channel estimation technique as the wireless channel estimation technique.

6. The method of claim 1, wherein determining the Doppler metric comprises:
   measuring Doppler effects associated with uplink data received from the UE; and
   determining, by the base station, the Doppler metric based at least in part on the Doppler effects associated with the uplink data received from the UE.

7. The method of claim 1, wherein determining the Doppler metric comprises:
   receiving, by the base station, information related to Doppler effects measured by the UE; and
   determining, by the base station, the Doppler metric based at least in part on the information related to the Doppler effects measured by the UE.

8. The method of claim 1, wherein determining the Doppler metric comprises:
   receiving, by the base station, an indication of the Doppler metric from the UE.

9. The method of claim 1, wherein selecting the first reference signal density configuration comprises:
   identifying a first Doppler classification associated with the Doppler metric; and
   selecting the first reference signal density configuration from the plurality of reference signal density configurations based at least in part on the first Doppler classification.

10. The method of claim 1, wherein transmitting, by the base station to the UE, the indication of the first reference signal density configuration comprises:
    transmitting, via a signaling radio bearer channel, the indication of the first reference signal density configuration.

11. The method of claim 1, wherein transmitting, by the base station to the UE, the indication of the first reference signal density configuration comprises:
    transmitting, via a resource grant to the UE, the indication of the first reference signal density configuration.

12. The method of claim 1, further comprising:
    determining an additional Doppler metric associated with the wireless channel and the UE;
    determining that the additional Doppler metric indicates a higher Doppler shift value than the Doppler metric; and
    determining a second reference signal density configuration based at least in part on the additional Doppler metric, the second reference signal density configuration having more reference signals per transmit time interval than the first reference signal density configuration.

13. The method of claim 1, wherein the extrapolation wireless channel estimation technique comprises a causal wireless channel estimation technique.

14. The method of claim 1, wherein the plurality of wireless channel estimation techniques further includes an interpolation wireless channel estimation technique.

15. The method of claim 14, wherein the interpolation wireless channel estimation technique comprises a non-causal wireless channel estimation technique.

16. A method of wireless communication comprising:
receiving, by a UE, an indication of a first reference signal configuration associated with a Doppler metric, the first reference signal configuration being indicated from a plurality of reference signal configurations comprising a plurality of reference signal density configurations and a plurality of wireless channel estimation techniques including an extrapolation wireless channel estimation technique;
determining a first reference signal density configuration and a wireless channel estimation technique indicated by the first reference signal configuration, the wireless channel estimation technique having a wireless channel estimation processing timeline; and
communicating with a base station in accordance with the first reference signal density configuration and the wireless channel estimation processing timeline.

17. The method of claim 16, further comprising:
receiving, by the UE, a first indication to communicate using a causal wireless channel estimation technique associated with the Doppler metric; and
determining to switch from the causal wireless channel estimation technique to a non-causal wireless channel estimation technique for communicating with the base station based at least in part on the first indication.

18. The method of claim 17, wherein determining to switch from the causal wireless channel estimation technique to the non-causal wireless channel estimation technique comprises:
receiving, by the UE, a second indication to communicate using the non-causal wireless channel estimation technique associated with a second Doppler condition different from a first Doppler condition associated with the Doppler metric; and
switching from the causal wireless channel estimation technique to the non-causal wireless channel estimation technique for communicating with the base station.

19. The method of claim 16, further comprising:
transmitting, by the UE, information related to Doppler effects measured by the UE.

20. The method of claim 16, further comprising:
transmitting, by the UE, an indication of a first Doppler metric for determining whether to change reference signal density configurations.

21. The method of claim 16, wherein communicating with the base station comprises:
transmitting, by the UE, an uplink data burst including reference signals and data in accordance with the first reference signal density configuration.

22. The method of claim 16, wherein communicating with the base station comprises:
receiving, by the UE, a first downlink data burst including reference signals and data in accordance with the first reference signal density configuration; and
decoding the first downlink data burst based at least in part on the first reference signal density configuration.

23. The method of claim 22, further comprising:
receiving, by the UE, an indication of a second reference signal density configuration different from the first reference signal density configuration, the second reference signal density configuration having more reference signals per transmit time interval than the first reference signal density configuration;
receiving a second downlink data burst including reference signals and data in accordance with the second reference signal density configuration; and
decoding the second downlink data burst based at least in part on the second reference signal density configuration.

24. The method of claim 16, further comprising:
transmitting, by the UE, an indication of a suggested reference signal density configuration.

25. The method of claim 16, wherein receiving, by the UE, the indication of the first reference signal density configuration comprises:
receiving, via a signaling radio bearer channel, the indication of the first reference signal density configuration.

26. The method of claim 16, wherein receiving, by the UE, the indication of the first reference signal density configuration comprises:
receiving, via a resource grant from the base station, the indication of the first reference signal density configuration.

27. An apparatus for wireless communication, comprising:
a processor;
memory coupled with the processor; and
instructions stored in the memory and operable, when executed by the processor, to cause the apparatus to:
determine a Doppler metric associated with a wireless channel and a user equipment (UE);
select, from a plurality of reference signal configurations, a first reference signal configuration based at least in part on the Doppler metric, the plurality of reference signal configurations comprising a plurality of reference signal density configurations and a plurality of wireless channel estimation techniques including an extrapolation wireless channel estimation technique; and
transmit an indication of the first reference signal configuration, the indication of the first reference signal configuration indicating a first reference signal density configuration and a wireless channel estimation technique having a wireless channel estimation processing timeline for communicating with the UE.

28. The apparatus of claim 27, wherein the instructions are operable to cause the apparatus to:
transmit a downlink data burst including reference signals and data in accordance with the first reference signal density configuration.

29. The apparatus of claim 27, wherein the instructions are operable to cause the apparatus to:
receive an uplink data burst including reference signals and data in accordance with the first reference signal density configuration.

30. An apparatus for wireless communication, comprising:
a processor;
memory coupled with the processor; and
instructions stored in the memory and operable, when executed by the processor, to cause the apparatus to:
receive an indication of a first reference signal configuration associated with a Doppler metric, the first reference signal configuration from a plurality of reference signal configuration comprising a plurality of reference signal density configurations and a plurality of wireless channel estimation techniques including an extrapolation wireless channel estimation technique;
determine a first reference signal density configuration and a wireless channel estimation technique indicated by the first reference signal configuration, the wireless channel estimation technique having a wireless channel estimation processing timeline; and communicate with a base station in accordance with the first reference signal density configuration and wireless channel estimation processing timeline.

31. The apparatus of claim 30, wherein the instructions are operable to cause the apparatus to:

receive a first indication to communicate using a causal wireless channel estimation technique associated with the Doppler metric; and determine to switch from the causal wireless channel estimation technique to a non-causal wireless channel estimation technique for communicating with the base station based at least in part on the first indication.

* * * * *